United States Patent Office 3,460,096
Patented Aug. 5, 1969

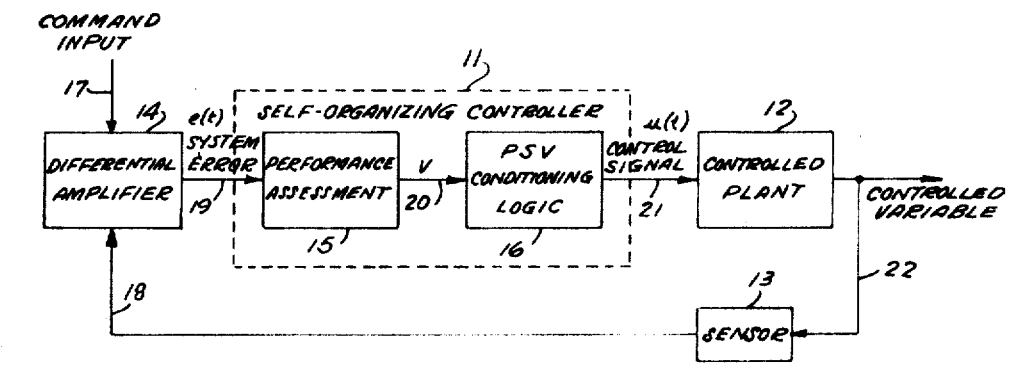
FIG. 1. BLOCK DIAGRAM - TYPICAL SELF-ORGANIZING CONTROL SYSTEM FOR SINGLE VARIABLE
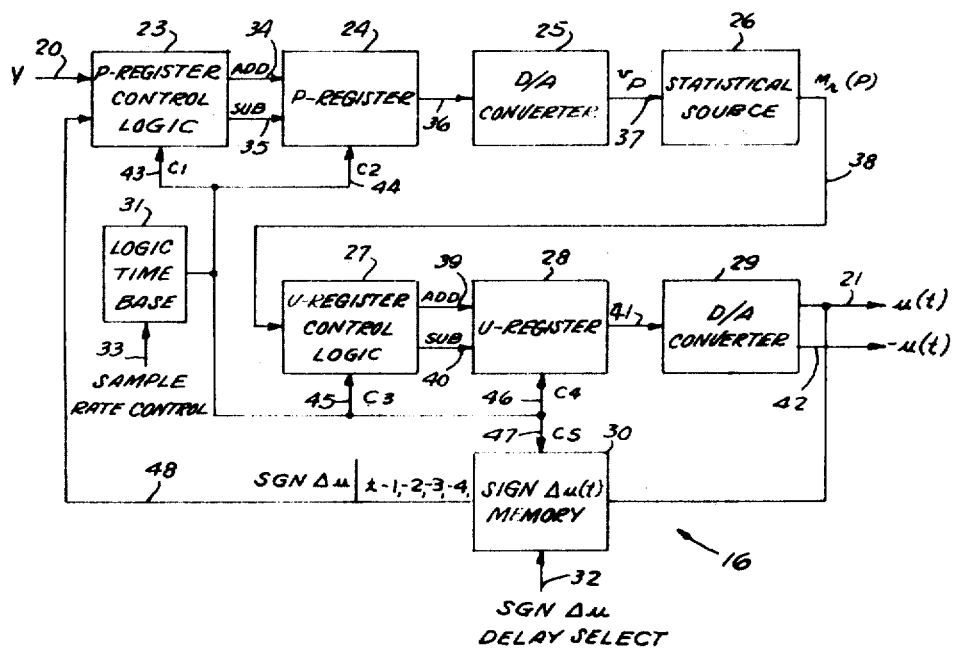
FIG. 2. BLOCK DIAGRAM - PSV CONDITIONING LOGIC
INVENTOR.
ROGER L. BARRON,
BY
Berman, Davidson & Berman
ATTORNEYS.

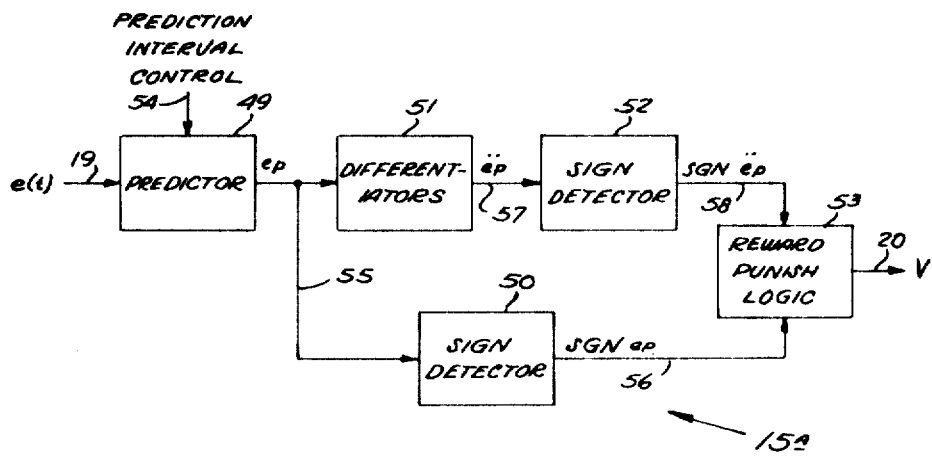
FIG. 3. BLOCK DIAGRAM-PERFORMANCE ASSESSMENT, TYPE I
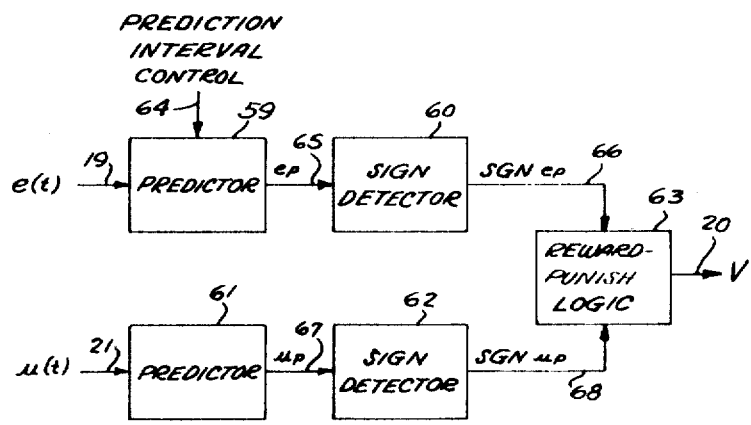
FIG. 4. BLOCK DIAGRAM-PERFORMANCE ASSESSMENT, TYPE II

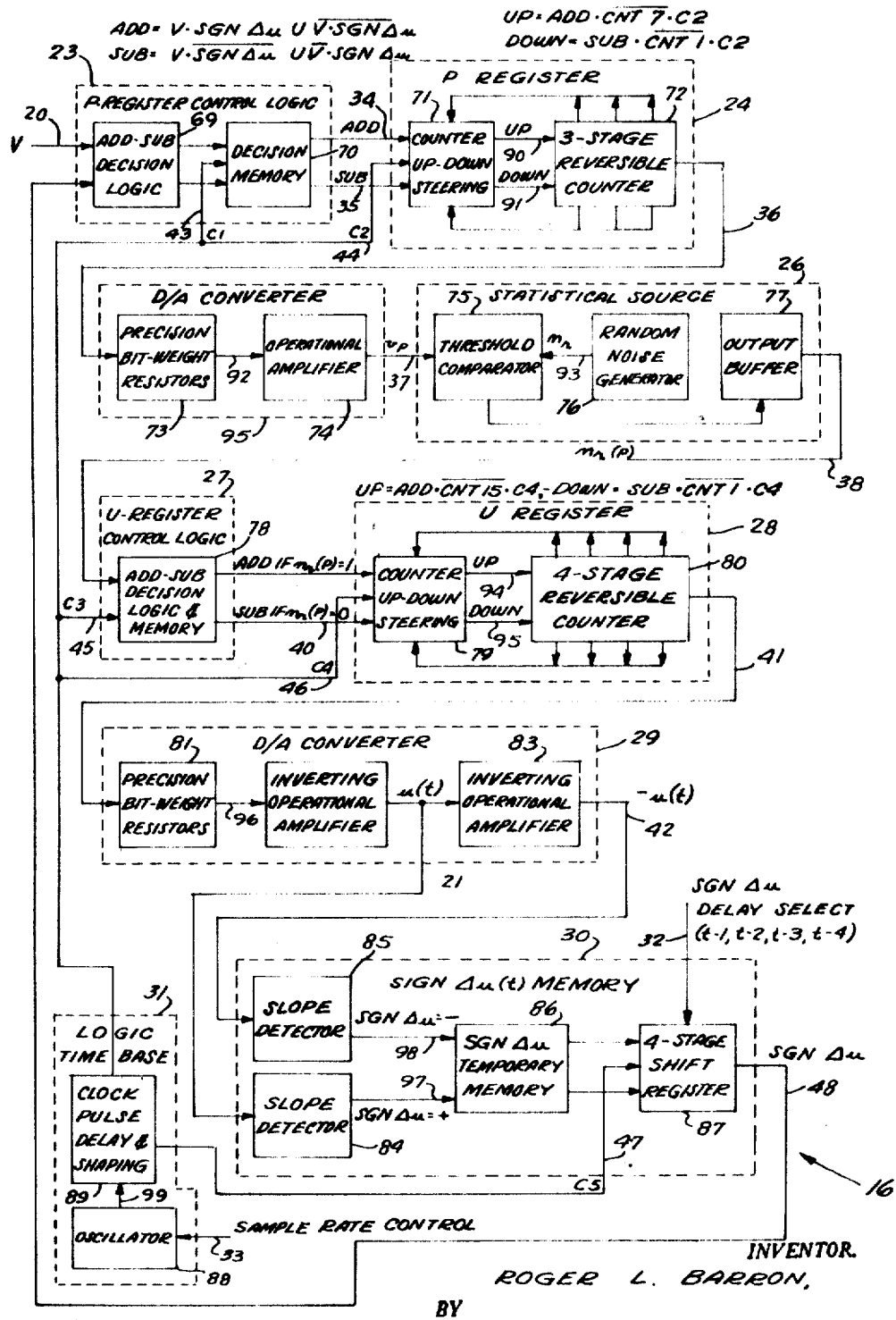
FIG. 5. FUNCTIONAL DIAGRAM - PSV CONDITIONING LOGIC

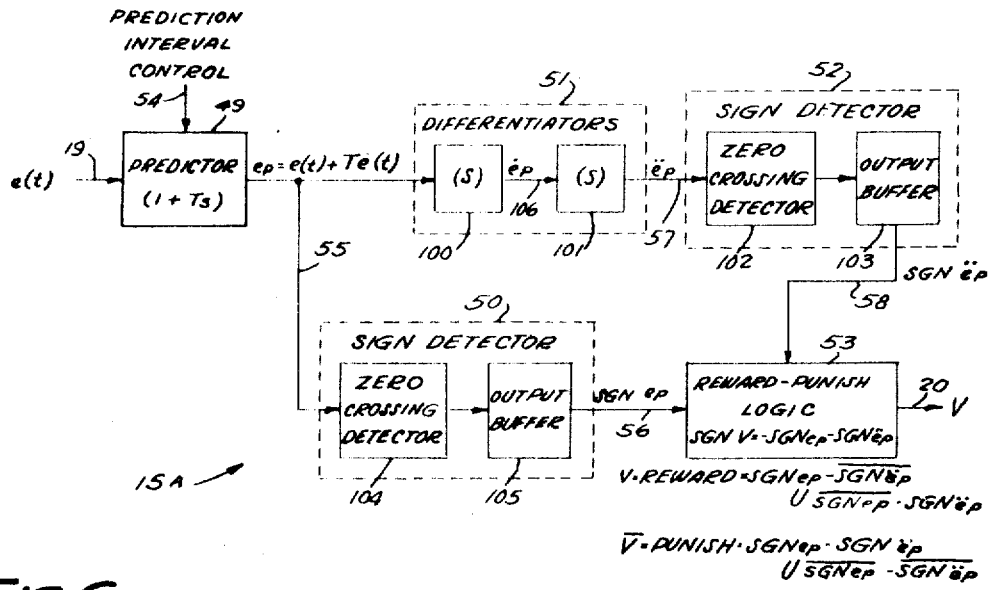
FIG. 6. FUNCTIONAL DIAGRAM - PERFORMANCE ASSESSMENT, TYPE I
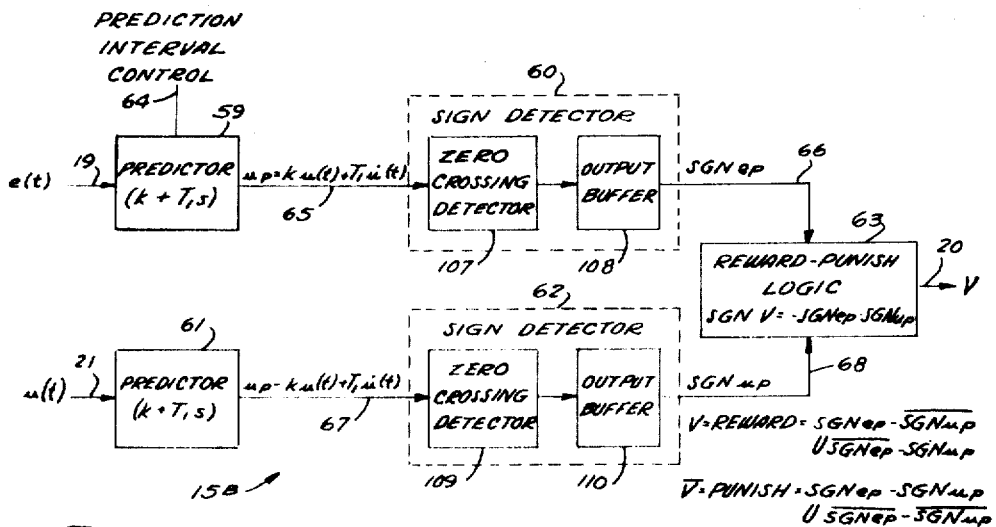
FIG. 7. FUNCTIONAL DIAGRAM - PERFORMANCE ASSESSMENT, TYPE II

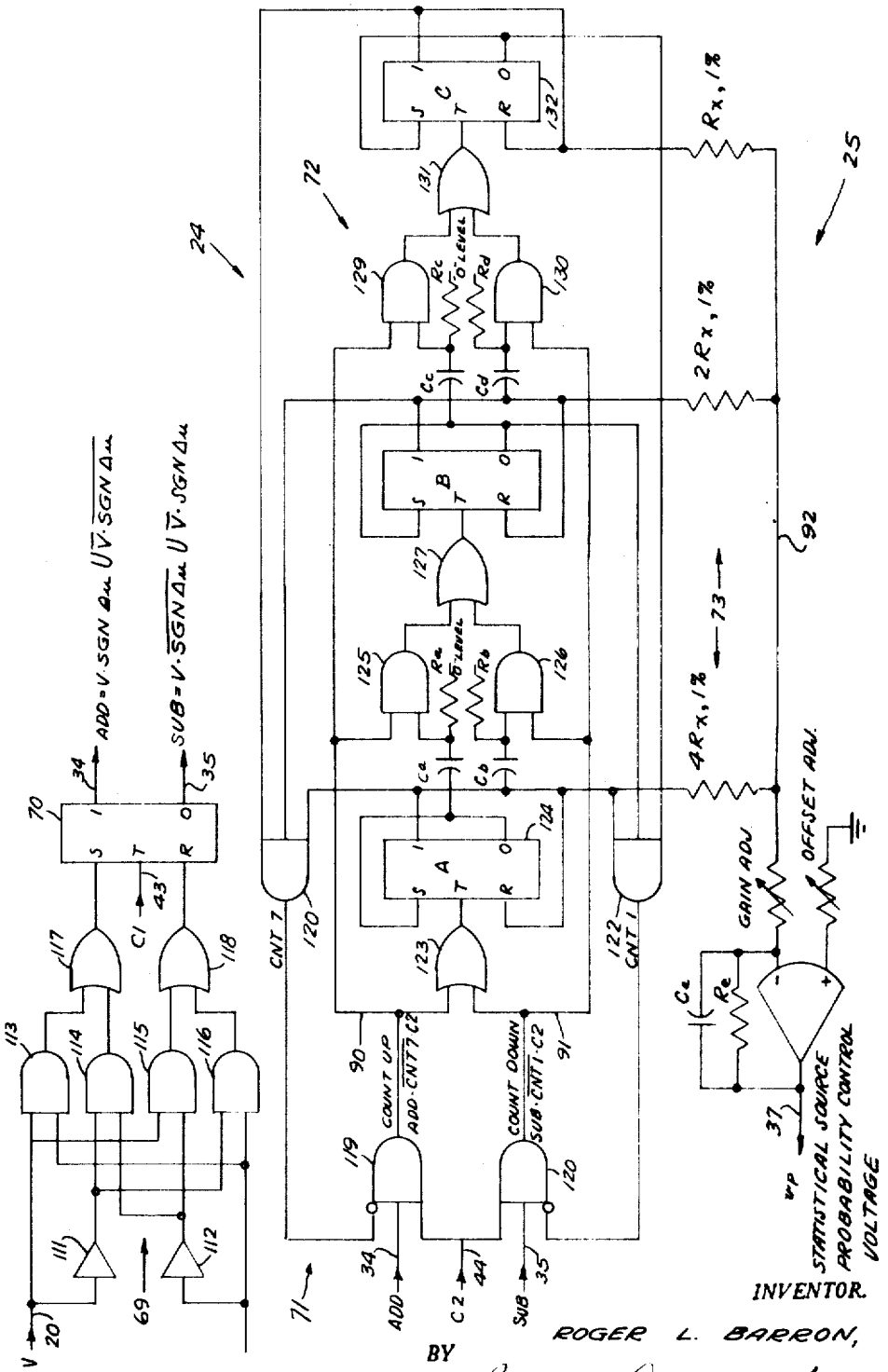

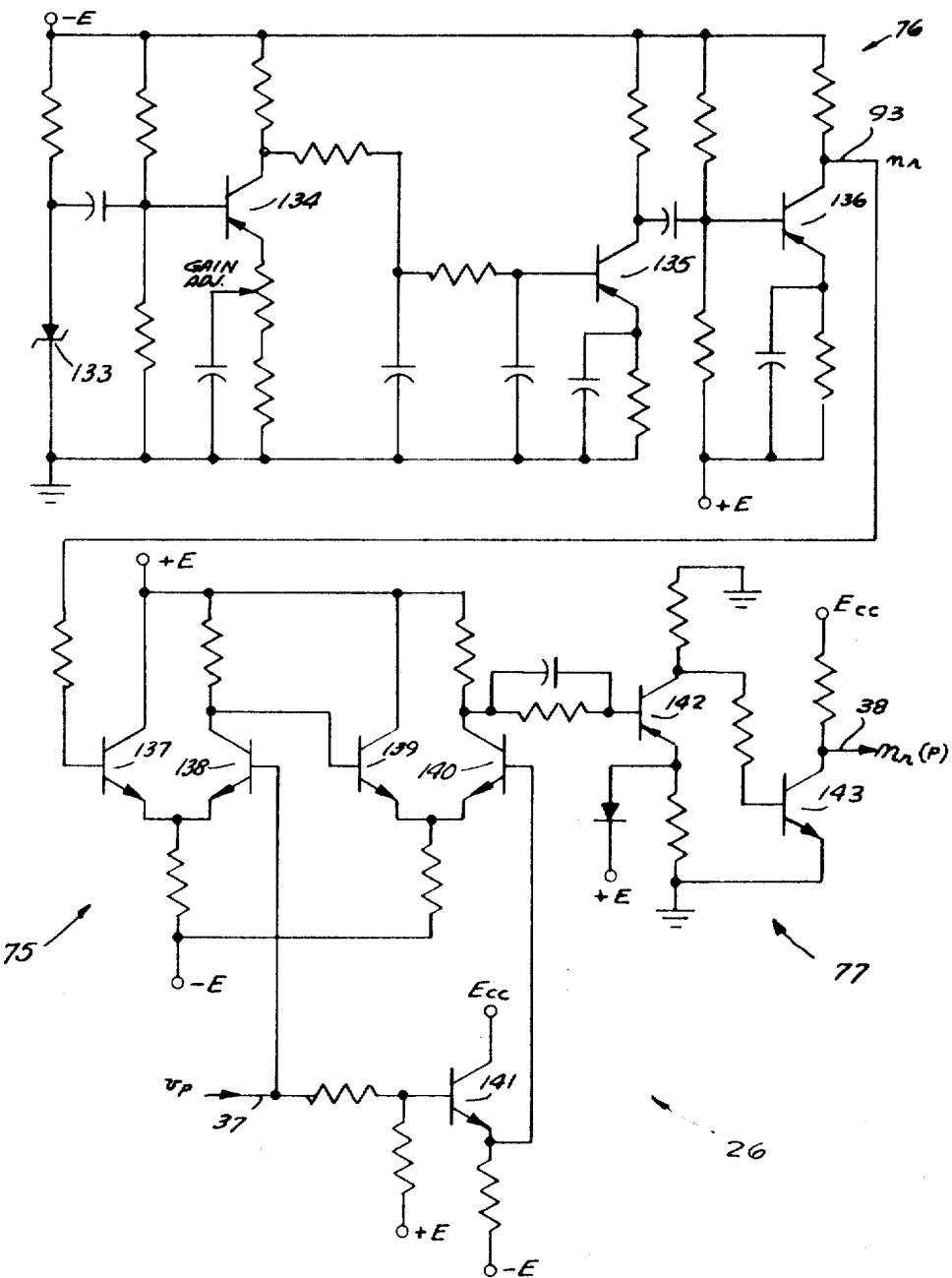
FIG. 9. FUNCTIONAL SCHEMATIC - STATISTICAL SOURCE

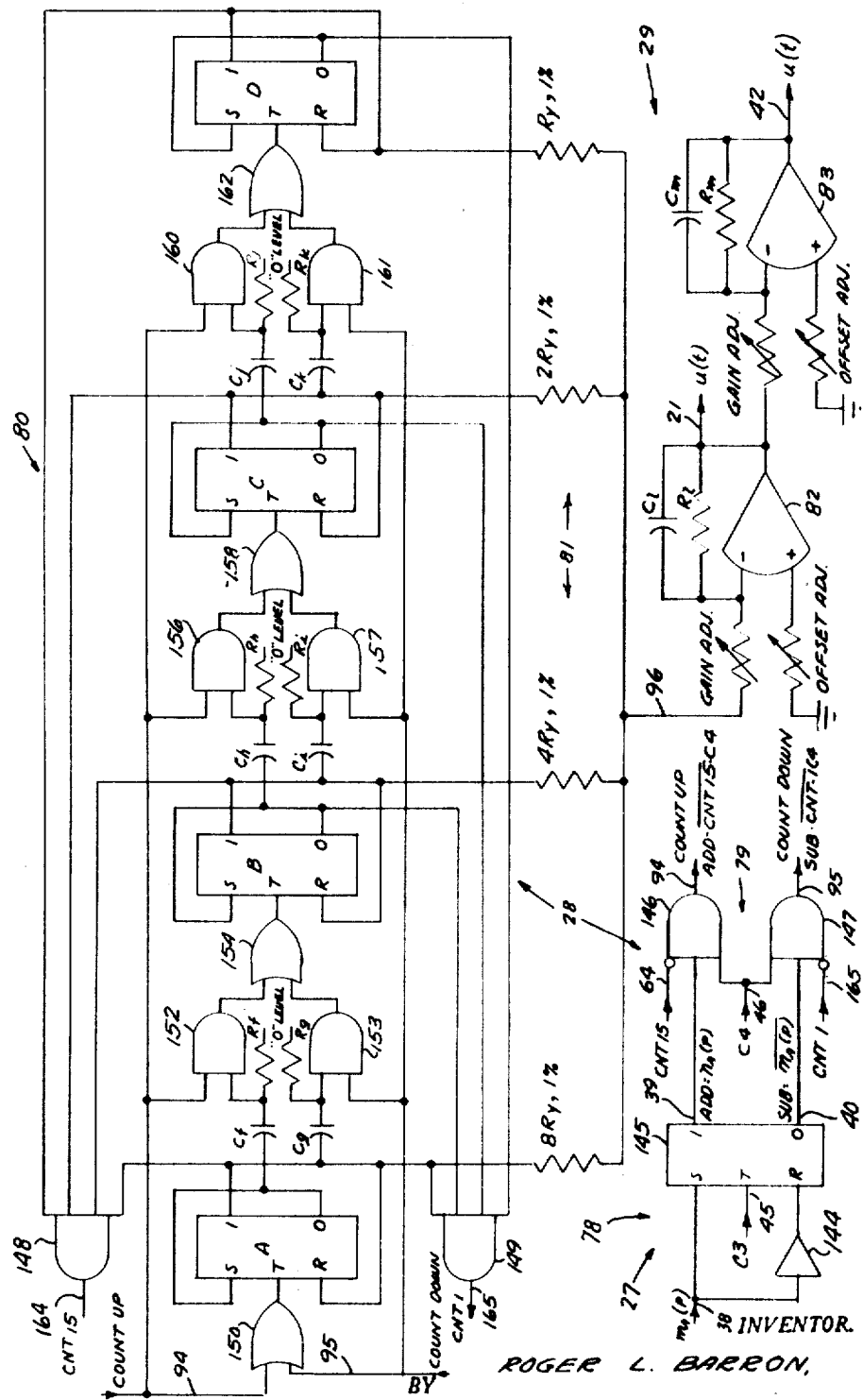
FIG. 10. FUNCTIONAL SCHEMATIC-U REGISTER CONTROL LOGIC, D/A CONVERSION
INVENTOR.
ROGER L. BARRON,
Berman, Davidson & Berman
ATTORNEYS.

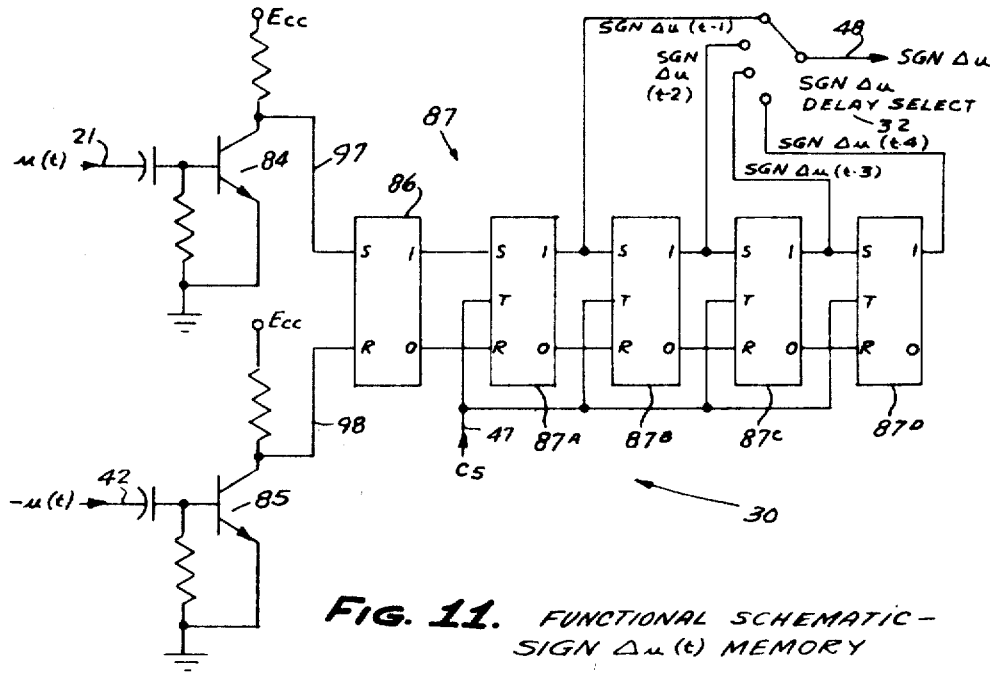
FIG. 11. FUNCTIONAL SCHEMATIC— SIGN $\Delta u(t)$ MEMORY
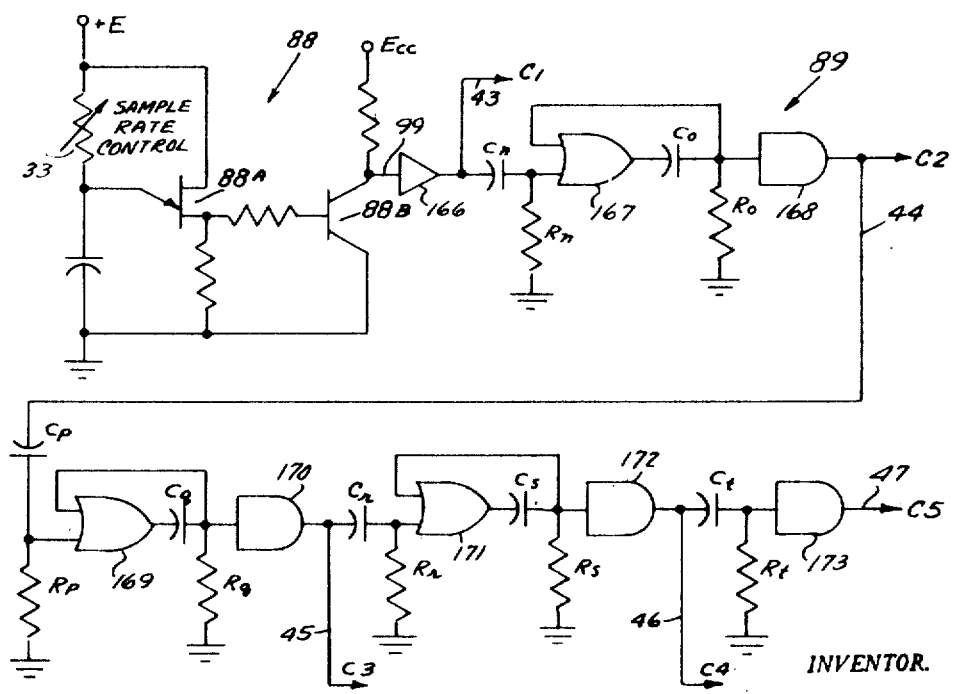
FIG. 12. FUNCTIONAL SCHEMATIC—BY LOGIC TIME BASE
INVENTOR.
ROGER L. BARRON,
*Berman, Bardson & Berman*
ATTORNEYS.

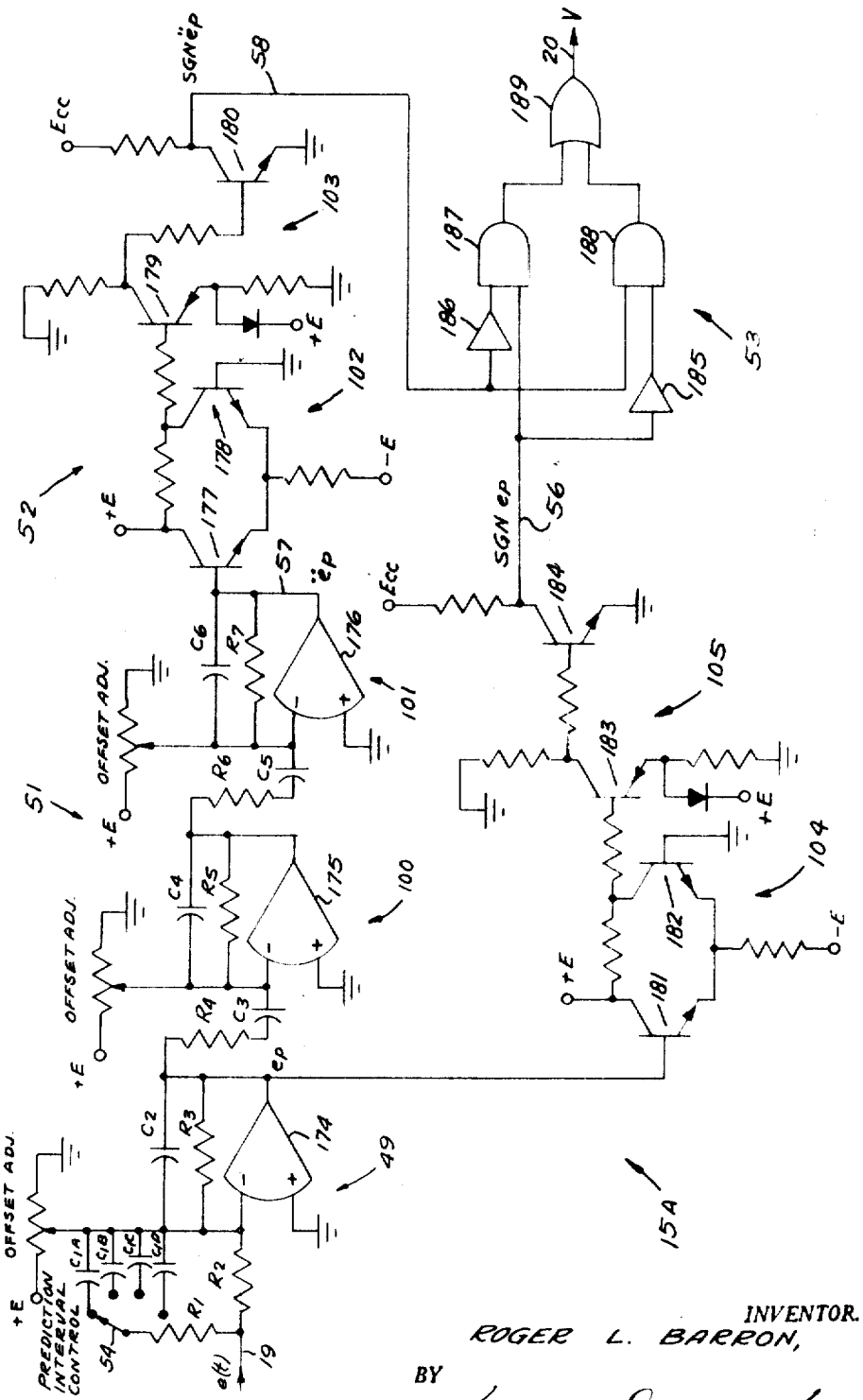
Fig. 13. Functional Schematic—Performance Assessment Type I

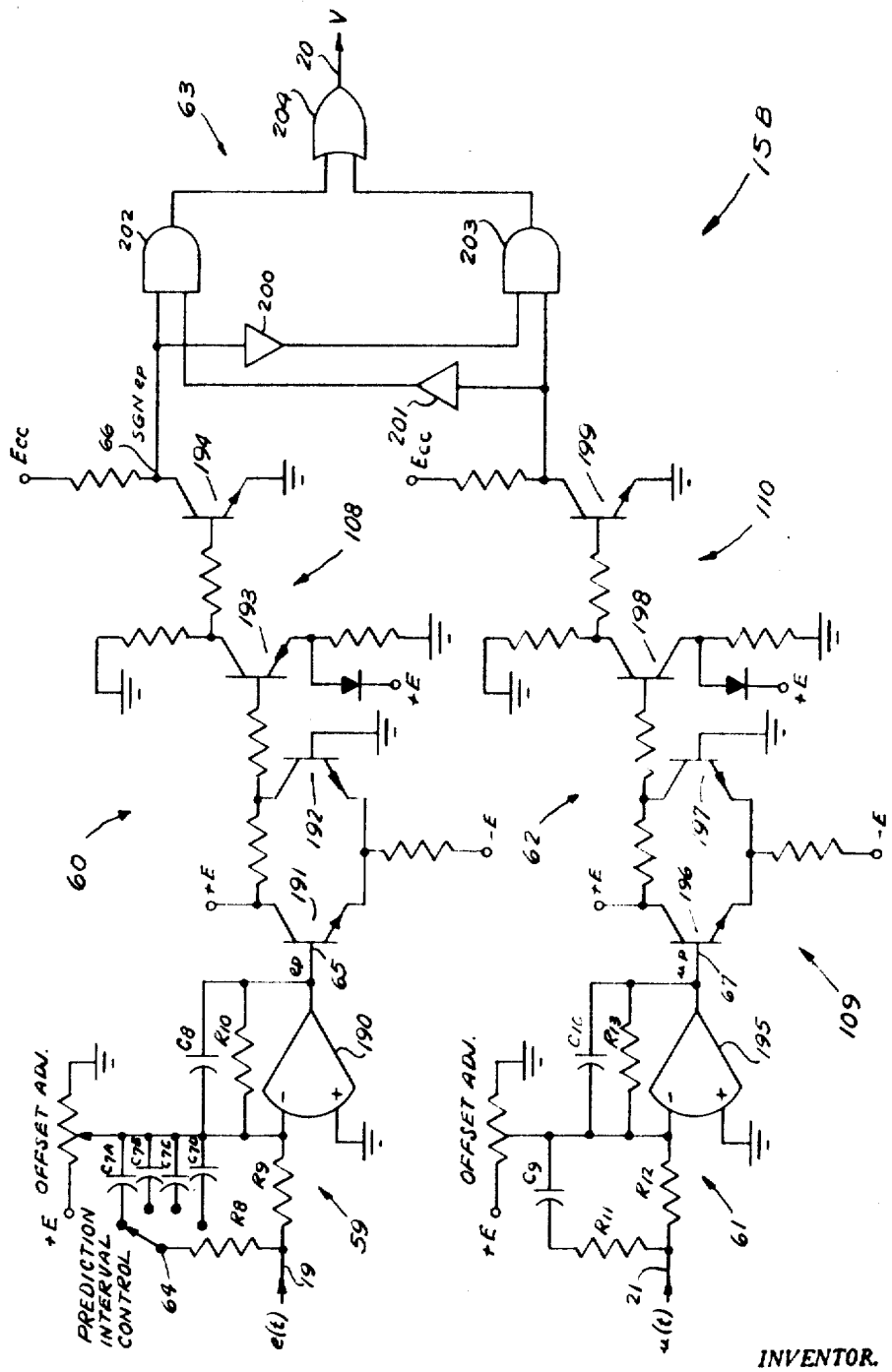

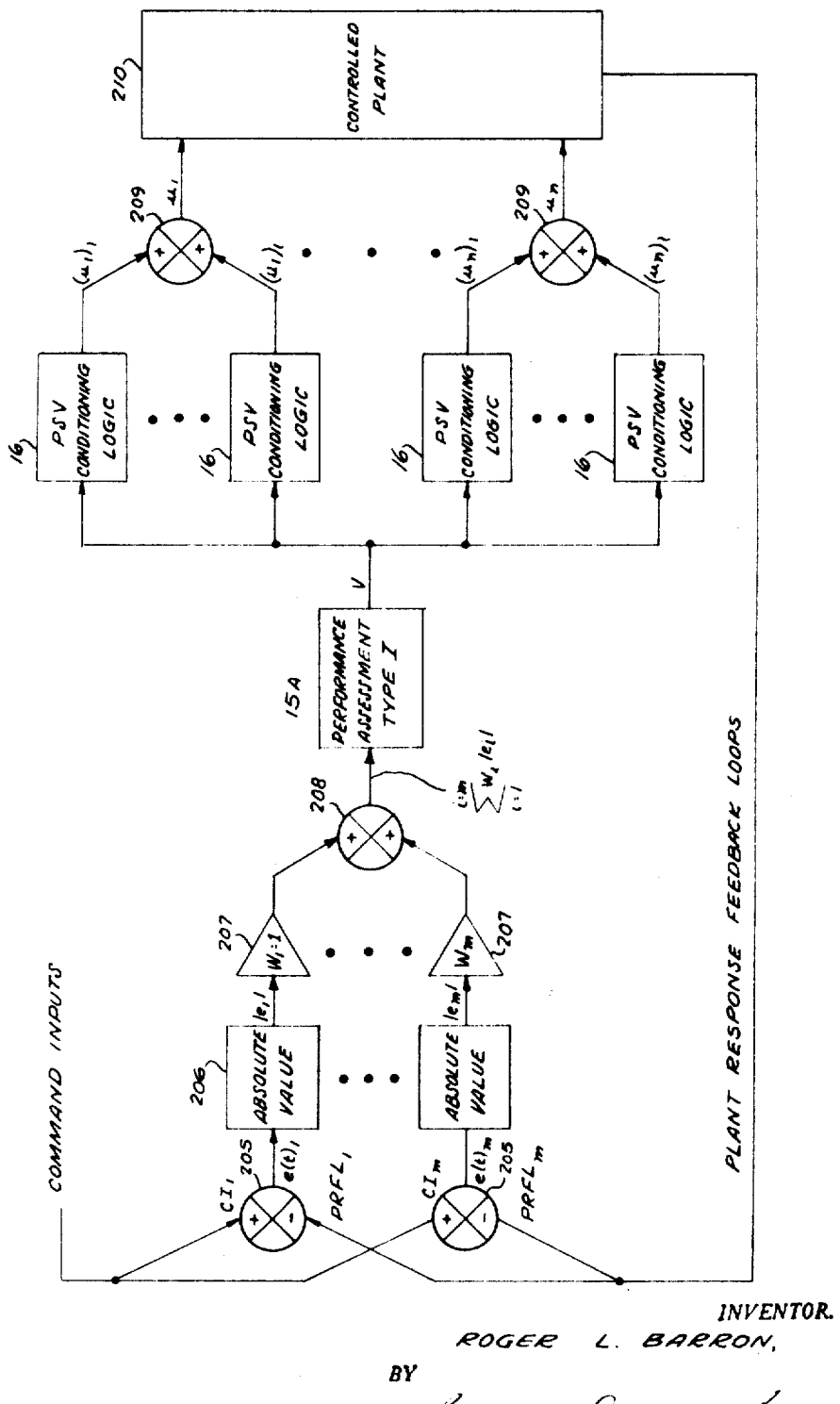

3,460,096
SELF-ORGANIZING CONTROL SYSTEM
Roger L. Barron, 8605 Ardfour Lane,
Burke, Va. 22015
Continuation-in-part of application Ser. No. 535,551,
Mar. 18, 1966. This application July 14, 1966, Ser.
No. 565,162
Int. Cl. G05b 13/02
U.S. Cl. 340—172.5                         41 Claims

ABSTRACT OF THE DISCLOSURE

The disclosure relates to a self-organizing control system requiring minimum information storage capable of control of a plant by combining statistical decision theory to determine the true instantaneous plant performance, prediction theory to determine the performance trend, and rapid trial generation to ascertain what must be done to improve the performance trend. This is provided by on-line sampling and changing of system operation. The disclosure also includes performance assessment units and a probability state variable unit as subcombinations for carrying out the control operation.

---

The application is a continuation-in-part of applicant's previously filed patent application Serial No. 535,551, filed March 18, 1966, and entitled "Self-Organizing Control System" and now abandoned.

This invention relates to self-organizing control systems and, more particularly, to a high-speed self-organizing control system requiring a minimum of information storage. The disclosure in this application describes a self-organizing control system that uses only a short-term record of its control signal experiments and requires essentially no memory for the sequences of system performance values which result during controller operation. Successful high-speed self-organization is accomplished by the system via generation of internal signals representing, at any point in time: (1) polarity of a recent control signal change and (2) instantaneous control system performance.

A main object of the invention is to provide a novel and improved self-organized control system wherein predicted system performance is evaluated on-line either continuously or periodically to modify the course of action pursued by the self-organizing elements of the system.

A further object of the invention is to provide a novel and improved self-organizing control system which employs a performance assessment stage which is highly effective in a wide range of control system applications, the performance assessment stage being of a nature to be incorporated in a self-contained module which is compatible with a variety of designs of other stages of the over-all system, the module being applicable to many areas directed to problems of a specific type, such as stabilization, control, and dynamic process identification.

A further object of the invention is to provide an improved self-organizing control system employing a novel and efficient probability state variable conditioning logic module, namely, a device which changes its output state in response to a conditioning signal from a performance assessment module, said conditioning logic module basing each change of state on both the level of the received conditioning signal and the internal memory record of that output state change which (acting through the environment) resulted in the conditioning signal, whereby the ability of the conditioning logic module to associate cause and effect, basing its decisions on accumulated statistical evidence concerning the presence of predicted results of its past actions, permits realization of effective self-organizing control actions, the conditioning logic module being applicable to a wide range of situations, from those involving linear, single variable control problems to situations involving multiple, coupled variables and time-varying, nonlinear dynamic environments, and being applicable to many problems of a specific type, such as stabilization, control, and dynamic process identification, as above-mentioned.

A further object of the invention is to provide a novel and improved self-organizing control system employing a dynamic performance assessment means which can process information pertaining to all significant variables of the controlled process, thereby providing computation of a single, unified performance measure which is a function of all significant variables of the controlled process, said unified performance measure being used with multiple conditioning logic modules to generate control action signals for multiple actuation devices, the conditioning logic modules being at least equal in number to the number of such actuation devices, and probability state variable conditioning logic being used in said conditioning logic modules to obtain an efficient search within the multivariable parameter space represented by said multiple control action signals, thus producing effective control actions capable of involving all actuation devices simultaneously when required.

A further object of the invention is to provide an improved self-organizing control system which produces satisfactory control without the usual reliance on a priori data during design and operation of the system, said a priori data pertaining to the characteristics of the controlled plant and the environment in which it operates, this freedom from reliance on a priori data being accomplished without generating limit cycle oscillations of the controlled variable, elimination of said limit-cycle oscillations being a result of the random output sequences produced by the probability state variable conditioning logic.

A still further object of the invention is to provide an improved self-organizing control system in which the outputs of multiple, parallel, probability state variable conditioning logic modules are summed algebraically to provide with high reliability the control signal for each channel of actuation, said high reliability being a consequence of the tolerance of the self-organzing controller in this parallel configuration for malfunctions or failures of some but not all of the parallel-connected conditioning logic modules, said configuration also providing improved quality of performance of the self-organizing controller by virtue of the additional dynamic range available in the regulating control signal, which additional dynamic range is afforded by the parallel connection of conditioning logic modules.

A yet further object of the invention is to provide an improved self-organizing control system in which the quality of control is not critically sensitive to the amplitudes or frequencies of noise components present in the signals from the sensors, this relative insensitivity to noise being the result of statistical decision processes employed by the probability state variable conditioning logic.

Detailed background discussions of the theory and application of self-organizing control systems would be beyond the scope of this patent application disclosure. A survey of the underlying theory and practice as relates to the self-organizing control system disclosed in this application is contained in the technical paper "Self-Organizing and Learning Control Systems" by Roger L. Barron, published in conjunction with the 1966 Bionics Symposium sponsored by the Air Force Avionics Laboratory, Research and Technology Division, Air Force Systems Command, United States Air Force, Wright-Patterson Air Force Base, Ohio, which symposium was conducted May 2–5, 1966, in Dayton, Ohio. Said paper presents, in addition to theoretical matters, the results of an investigation of the application of the self-organizing control system disclosed in this application to pitch-rate and normal-acceleration control of a high-performance aircraft. Reference is also made in the said paper to single-axis and multiple-axis control of orbiting spacecraft; throttle control for aircraft landing approaches; and control of large, flexible space launch vehicles.

Further objects and advantages of the invention will become apparent from the following description and claims, and from the accompanying drawings, wherein:

FIGURE 1 is a block diagram of a generalized typical self-organizing control system employing a novel and improved performance assessment stage in conjunction with a novel and improved conditioning logic stage constructed in accordance with the present invention.

FIGURE 2 is a block diagram of the novel and improved conditioning logic stage, or probability state variable (PSV) conditioning logic, employed in the self-organizing control system of FIGURE 1.

FIGURE 3 is a block diagram of a first type of novel and improved performance assessment stage which may be employed in the self-organizing control system of FIGURE 1.

FIGURE 4 is a block diagram of a second type of novel and improved performance assessment stage which may be employed in the self-organizing control system of FIGURE 1.

FIGURE 5 is a functional diagram detailing the operations which comprise the PSV conditioning logic of FIGURE 2.

FIGURE 6 is a functional diagram detailing the operations which comprise the first type of performance assessment illustrated in FIGURE 3.

FIGURE 7 is a functional diagram detailing the operations which comprise the second type of performance assessment illustrated in FIGURE 4.

FIGURE 8 is a functional schematic detailing the generalized electrical circuit of the P register, P-register control logic, and digital-to-analog conversion of the P-register contents as employed in the PSV conditioning logic of FIGURES 2 and 5.

FIGURE 9 is a functional schematic detailing the generalized electrical circuit of the statistical source as employed in the PSV conditioning logic of FIGURES 2 and 5.

FIGURE 10 is a functional schematic detailing the generalized electrical circuit of the U register, U-register control logic, and digital-to-analog conversion of the U-register contents as employed in the PSV conditioning logic of FIGURES 2 and 5.

FIGURE 11 is a functional schematic detailing the generalized electrical circuit of the sign $\Delta u(t)$ memory as employed in the PSV conditioning logic of FIGURES 2 and 5.

FIGURE 12 is a functional schematic detailing the generalized electrical circuit of the logic time base as employed in the PSV conditioning logic of FIGURES 2 and 5.

FIGURE 13 is a functional schematic detailing the generalized electrical circuit of the first type of performance assessment illustrated in FIGURES 3 and 6.

FIGURE 14 is a functional schematic detailing the generalized electrical circuit of the second type of performance assessment illustrated in FIGURES 4 and 7.

FIGURE 15 is a block diagram depicting a generalized self-organizing control system consisting of a controlled plant involving multiple variables and of a plurality of the PSV conditioning logic stages of FIGURE 2 in conjunction with the performance assessment stage of FIGURE 3.

Referring to the drawings, FIGURE 1 diagrammatically illustrates a typical self-organizing control system which employs novel and improved PSV conditioning logic and performance assessment stages constructed in accordance with the present invention. The system illustrated is a closed-loop system consisting of the controlled plant 12 driven by the control signal on channel 21 [$u(t)$] which is generated by the self-organizing control subsystem 11 based on the system error signal on channel 19 [$e(t)$] which is formed by a conventional differential amplifier 14 operating on the command input signal on channel 17 and a feedback signal on channel 18 which is produced by a sensor 13 monitoring the plant controlled variable on channel 22. The self-organizing control subsystem 11 consists of the performance assessment stage 15 (to be fully described later) which develops a "reward-punish" signal (V) on channel 20 based on the system error signal on channel 19, and the PSV conditioning logic stage 16 (to be fully described later) which generates a plant control signal on channel 21 [$u(t)$] in response to the "reward-punish" signal on channel 20 and an internally-stored history of past directions of change in the u(t) control signal on channel 21. The characteristics of the $u(t)$ control signal on channel 21 furnished to the plant 12 by the self-organizing control subsystem 11 are such as to achieve and maintain a minimum (ideally zero) system error signal on channel 19 regardless of arbitrary variations in the command signal input on channel 17 and variations in the controlled variable on channel 22 caused by changes within, or external disturbances acting upon the controlled plant 12.

Although the sensor 13 is illustrated as an external function in FIGURE 1, it may obviously be incorporated as part of the controlled plant 12, in accordance with well-known practice, since its only requirement is to deliver to differential amplifier 14 a compatible feedback signal on channel 18 representing the state (controlled variable on channel 22) of controlled plant 12. Alternatively, the sensor 13 could be of the type which generates the error signal on channel 19 directly with the command input signal on channel 17 supplied to the sensor by suitable electrical or other means, in accordance with well-known practice. In any event, the conventional differential amplifier 14 could be incorporated as part of the controlled plant 12, in accordance with standard practice, thereby reducing the required plant interface to the command input signal on channel 17, the system error signal on channel 19 to be delivered to the self-organizing control subsystem 11, and the resultant $u(t)$ control signal on channel 21 generated by control subsystem 11.

The simplest form of self-organizing control system is illustrated in FIGURE 1, i.e., a plant requiring control of only a single variable. The novel and improved self-organizing control techniques described in this disclosure are as readily adaptable to a complex, multivariable plant requiring simultaneous control of many related (coupled) or unrelated variables. Dependent upon plant characteristics, a typical self-organizing subsystem as illustrated could be used to control each variable; or a form of self-organizing control subsystem consisting of a single performance assessment stage and several PSV conditioning logic stages could be used to control multiple variables; or a form of self-organizing control subsystem consisting of a single performance assessment stage and multiple PSV conditioning logic stages whose outputs are paralleled by means of a conventional summing amplifier could be used to provide very reliable control of one variable. An extremely useful characteristic of these novel and improved self-organizing control techniques when applied to a multi-variable plant is the fact that specific details regarding intervariable coupling (i.e., the interaction or interdependency of variables) need not be known to the designer or user of the self-organizing control system.

It will be readily apparent that in a system such as illustrated in FIGURE 1, a vital function to be performed is that of dynamic performance assessment. System performance must be evaluated periodically or continuously to reinforce properly the courses of action taken by the PSV conditioning logic in generating the plant control signal. Since the performance assessment function relates directly to the selected criterion against which system performance is measured, this function tends to be problem-specific, and the performance criterion type and prediction time constant must be selected with attention to the requirements of the specific plant to be controlled. This limitation obviates design of a universal performance assessment function but does not preclude development of broad types of performance assessment function, with each type allowing for some parameter (for example, time constant) adjustability to accommodate widely different plant characteristics. The two types of performance assessment stages illustrated in FIGURES 3 and 4, and described in detail later in this disclosure, are examples of such broad types of performance assessment function.

FIGURE 3 diagrammatically depicts one type of performance assessment function developed as a part of the invention herein disclosed. The essential purpose of performance assessment stage 15A is to perform a continuous assessment of self-organizing control system performance as a function of the $e(t)$ system error signal on channel 19 and to generate a V "reward-punish" signal on channel 20 based upon this assessment. The criterion used in the type I performance assessment stage 15A for generating the V signal on channel 20 is based on a tangentially-extrapolated predictive function of system error. The predicted system error signal on channel 55 ($e_p$) is calculated by a predictor function 49, and may be expressed as $e_p = e(t) + T\dot{e}(t)$, where $e(t)$ is the instantaneous system error signal on channel 19 and T is the prediction interval (constant). Since the over-all goal of the system is to reduce $e(t)$ to zero as rapidly as possible without overshoot (which could result in an oscillatory convergence of the error to zero), it is desirable to generate a V signal on channel 20 which produces maximum acceleration until the predicted error changes sign and then an exponential convergence to zero error. A V signal of the form sgn $V = $ minus sgn $e_p \cdot$ sgn $\ddot{e}_p$ produces this result. Qualitatively, this form of V signal "rewards" those PSV conditioning logic actions which accelerate $e_p$ toward zero and "punishes" those actions which accelerate $e_p$ away from zero, while establishing the desired terminal response along the line $e + T\dot{e} = 0$. In theory, a ternary V signal, where $+1=$"reward," $-1=$"punish," and $0=$zero reinforcement, could be employed. In practice, satisfactory results are obtained with a binary V signal, as described in this disclosure, where $+1=$"reward" and $0=$"punish."

FIGURE 3 details the basic functions performed by the type I performance assessment stage to generate the above form of V signal. A predictor function 49, incorporating a prediction interval control 54 for flexibility of application, operates on the $e(t)$ system error signal on channel 19 to obtain the predicted system error signal $e_p$ on channel 55, which in turn is operated on by differentiators 51 to obtain its second derivative, $\ddot{e}_p$, the signal on channel 57. Sign detectors 50 and 52 monitor $e_p$ and $\ddot{e}_p$, respectively, to provide sgn $e_p$, the signal on channel 56, and sgn $\ddot{e}_p$, the signal on channel 58, which, when gated by the "reward-punish" logic 53, generate the binary V signal on channel 20.

The theory behind the use of the second derivative of the predicted error signal ($\ddot{e}_p$) rather than some other derivative is fully set forth in the above noted technical paper entitled "Self-Organizing and Learning Control Systems" which was incorporated herein by reference. The section thereof entitled Performance Assessment clearly shows mathematically that the sign of the $N^{th}$ derivative of $e_p$ is compared with the sign of $e_p$ where N is the order of the system. It is apparent, as in the above noted technical paper and herein that the system order is two for the preferred embodiment and therefore the second derivative of $e_p$ is fed to the reward-punish logic for comparison with $e_p$.

The operations which comprise the type I performance assessment stage of FIGURE 3 are illustrated in more detail in FIGURE 6. The operation performed by the predictor 49 on the $e(t)$ signal on channel 19 may be expressed approximately as the Laplace transform $(1+Ts)$, which yields $e_p$ (the signal on channel $55) = e(t) + T\dot{e}(t)$, where T is that period of time selected by prediction interval control 54. The predicted error $e_p$ is then fed to differentiators 51, consisting of differentiator stages 100 and 101 in series, to obtain its second derivative, $\ddot{e}_p$, the signal on channel 57. The $e_p$ signal on channel 55 is also processed by a zero-crossing detector 104 and an output buffer 105 (level changer to obtain logic-compatible signals), which comprise sign detector 50, to obtain sgn $e_p$, the signal on channel 56. In like manner, $\ddot{e}_p$, the signal on channel 57, is processed by zero-crossing detector 102 and output buffer 103, comprising sign detector 52, to obtain sgn $\ddot{e}_p$, the signal on channel 58. The two binary signals, sgn $e_p$ and sgn $\ddot{e}_p$, are then operated on by "reward-punish" logic 53, which implements the function sgn $V = $ minus sgn $e_p \cdot$ sgn $\ddot{e}_p$, to provide the desired binary V signal on channel 20. The type I performance assessment stage 15A output may be expressed as the Boolean functions $$V = \text{``reward''} = \text{sgn } e_p \cdot \overline{\text{sgn } \ddot{e}_p} \; \cup \; \overline{\text{sgn } e_p} \cdot \text{sgn } \ddot{e}_p$$

when the output is a logical one, and $$\overline{V} = \text{``Punish''} = \text{sgn } e_p \cdot \text{sgn } \ddot{e}_p \; \cup \; \overline{\text{sgn } e_p} \cdot \overline{\text{sgn } \ddot{e}_p}$$

when the output is a logical zero.

The generalized electrical circuit and the circuit interconnections of the type I performance assessment stage 15A of FIGURES 3 and 6 are detailed by the functional schematic of FIGURE 13. Specific component values and supply voltages are not shown since they are unique to the characteristics of a given controlled plant and to the characteristics of the components (such as the operational amplifiers, logic gates, and transistors) used for hardware implementation of the functional schematic.

The predictor 49 operates on the $e(t)$ signal on channel 19 approximately per the Laplace transform $(1+Ts)$ to obtain the $e_p$ signal on channel 55 $[e_p = e(t) + T\dot{e}(t)]$. The prediction interval T is selected by prediction interval control 54. Conventional operational amplifier 174, capacitors C1A (or, in its place, C1B, C1C, or C1D) and C2, and resistors R1, R2, and R3 comprise a standard augmented differentiator with a double high frequency cutoff, whose output is the sum of the input and its first derivative, and whose input is relatively insensitive to high frequency noise. The ratio of resistors R3 and R2 establishes the amplification factor (unity in this case) applied by amplifier 174 to the $e(t)$ signal on channel 19. The time constant formed by resistor R3 and capacitor C1A (or, in its place, C1B, C1C, or C1D) determined the prediction interval T. Resistor R1 connected to capacitor C1A (or, in its place, C1B, C1C, or C1D) limits the high frequency response of predictor 49, and capacitor C2 shunting resistor R3 doubles the amount of attenuation of input frequencies higher than this limit, with both effects combining to render predictor 49 insensitive to high frequency noise which could mask the derivative output.

The predicted error signal $e_p$ on channel 55 is then fed to differentiator 100, a standard differentiator with double high frequency cutoff, which consists of conventional operational amplifier 175, capacitors C3 and C4, and resistors R4 and R5, to obtain the $\dot{e}_p$ signal on channel 106. The period of differentiation is established by resistor R5 and capacitor C3, while resistor R4 and capacitor C4 provide the required attenuation of high frequency noise. An identical differentiator 101 in series, consisting of operational amplifier 176, capacitors C5 and C6, and resistors R6 and R7, provides the second derivative of predicted error, the $\ddot{e}_p$ signal on channel 57. Sign detector 50, consisting of zero-crossing detector 104 and output buffer 105, then operates on the $e_p$ signal on channel 55 to obtain the required binary sgn $e_p$, the signal on channel 56. Sign information is extracted from the $e_p$ signal on channel 55 by emitter-coupled clippers 181 and 182, and is then operated on by level changer 183 and shaper 184. In an identical manner, the $\ddot{e}_p$ signal on channel 57 is processed by sign detector 52, consisting of zero-crossing detector 102 and output buffer 103, to provide the sgn $\ddot{e}_p$ signal on channel 58. Sign information is extracted by emitter-coupled clippers 177 and 178, and then transformed to the proper binary signal by level changer 179 and shaper 180.

The signs of the predicted error and its first derivative are then processed by "reward-punish" logic 53 to form the binary V signal on channel 20. First, inverters 185 and 186 generate $\overline{\text{sgn } e_p}$ and $\overline{\text{sgn } \ddot{e}_p}$, respectively. AND-gate 187 then forms the logical product sgn $e_p \cdot \overline{\text{sgn } \ddot{e}_p}$, and AND-gate 188 forms the logical product $\overline{\text{sgn } e_p} \cdot$ sgn $\ddot{e}_p$. The balance of the exclusive-OR function is performed by OR-gate 189 which forms the logical sum of logical products, sgn $e_p \cdot \overline{\text{sgn } \ddot{e}_p} \cup \overline{\text{sgn } e_p} \cdot$ sgn $\ddot{e}_p$, defined as V, the type I performance assessment stage 15A output parameter, the signal on channel 20.

FIGURE 4 diagrammatically illustrates a second type of performance assessment function developed as a part of the present invention. As in performance assessment stage 15A, the purpose of performance assessment stage 15B is to perform a continuous assessment of self-organizing control system performance as defined by the $e(t)$ system error signal on channel 19 and to generate a V ("reward-punish") signal on channel 20 based upon this assessment. The criterion used in the type II performance assessment stage 15B also uses a tangentially-extrapolated predictive function of system error. Starting with the expression used for V in the type I performance assessment stage 15A ($V=$minus sgn $e_p \cdot$ sgn $\ddot{e}_p$), and making the restrictive assumption that sgn $\ddot{e}_p=$sgn $u_p$, we obtain the expression $V=$minus sgn $e_p \cdot$ sgn $u_p$, where $e_p = e(t) + T\dot{e}(t)$ and we define $u_p$ as a predicted value of the plant control signal, $u_p = ku(t) + T_1\dot{u}(t)$. As in the type I performance assessment stage 15A, this form of V signal 20 "rewards" those PSV conditioning logic actions which accelerate $e_p$ toward zero, and "punishes" those actions which accelerate $e_p$ away from zero. In the type III performance assessment stage 15B, V, the signal on channel 20, is implemented as a binary signal where a logical one indicates a "reward" decision and a logical zero indicates a "punish" decision. Predicted system error, the signal on channel 65, is calculated by a predictor function 59, and may be expressed as $e_p = e(t) + T\dot{e}(t)$, where $e(t)$ is the instantaneous system error signal on channel 19 and T is the prediction interval constant selected by the prediction interval control 64. A similar predictor function 61, with a fixed prediction interval based on specific controlled plant 12 characteristics, operates on the $u(t)$ plant control signal on channel 21 to obtain a predicted value of the plant control signal, $u_p$, the signal on channel 67. Sign detectors 60 and 62 monitor $e_p$ and $u_p$, respectively, to provide sgn $e_p$, the signal on channel 66, and sgn $u_p$, the signal on channel 68, which, when gated by the reward-punish logic 63, generate the binary V signal on channel 20.

The operations which comprise the type II performance assessment stage of FIGURE 4 are illustrated in greater detail in FIGURE 7. The operation performed by the predictor 59 on the $e(t)$ signal on channel 19 may be expressed approximately as the Laplace transform $(1+Ts)$, which yields $e_p$ (the signal on channel 65) = $e(t) + T\dot{e}(t)$, where T is that period of time selected by prediction interval control 64. In like manner, the $u(t)$ plant control signal on channel 21 is operated on by predictor 61 approximately per the Laplace transform $(k+T_1s)$ to obtain $u_p$ (the signal on channel 67) = $ku(t) + T_1\dot{u}(t)$, where $k$ is a fixed gain, and $T_1$ is a fixed prediction interval and $k$ and $T_1$ are chosen such that sgn $u_p=$sgn $\dot{u}$ unless $u$ is at one of its limits, in which event sgn $u_p=$sgn $u$. The $e_p$ signal on channel 65 is processed by a zero-crossing detector 107 and an output buffer 108 (level changer to obtain logic-compatible signals), which comprise sign detector 60, to obtain sgn $e_p$, the signal on channel 66. In an identical manner, $u_p$, the signal on channel 67, is processed by zero-crossing detector 109 and output buffer 110, comprising sign detector 62, to obtain sgn $u_p$, the signal on channel 68. The two binary signals, sgn $e_p$ and sgn $u_p$, are then operated on by "reward-punish" logic 63, which implements the function sgn $v=$minus sgn $e_p \cdot$ sgn $u_p$, to provide the desired binary V signal on channel 20. The type II performance assessment stage 15B output may be expressed as the Boolean function $V=$"reward"$=$sgn $e_p \cdot \overline{\text{sgn } u_p} \cup \overline{\text{sgn } e_p} \cdot$ sgn $u_p$ when the output is a logical one, and $V=$"punish"$=$sgn $e_p \cdot$ sgn $u_p \cup \overline{\text{sgn } e_p} \cdot \overline{\text{sgn } u_p}$ when the output is a logical zero.

The generalized electrical circuit and the circuit interconnections of the type II performance assessment stage 15B of FIGURES 4 and 7 are detailed by the functional schematic of FIGURE 14. Specific component values and supply voltages are not shown since they are unique to the characteristics of a given controlled plant and to the characteristics of the components (such as the operational amplifiers, logic gates, and transistors) used for hardware implementation of the functional schematic.

The predictor 59 operates on the $e(t)$ signal on channel 19 approximately per the Laplace transform $(1+Ts)$ to obtain the $e_p$ signal on channel 65 $[e_p = e(t) + T\dot{e}(t)]$. The prediction interval T is selected by prediction interval control 64. Conventional operational amplifier 190, capacitors C7A (or, in its place, C7B, C7C, or C7D) and C8, and resistors R8, R9 and R10 comprise a standard augmented differentiator with a double high frequency cutoff, whose output is the sum of the input and its first derivative, and whose input is relatively insensitive to high frequency noise. The ratio of resistors R10 and R9 establishes the amplification factor (unity in this case) applied by amplifier 190 to the $e(t)$ signal on channel 19. The time constant formed by resistor R10 and capacitor C7A (or, in its place, C7B, C7C, or C7D) determines the prediction interval T. Resistor R8 connected to capacitor C7A (or, in its place, C7B, C7C, or C7D) limits the high frequency response of predictor 59, and capacitor C8 shunting resistor R10 doubles the amount of attenuation of input frequencies higher than this limit, with both effects combining to render predictor 59 insensitive to high frequency noise which could mask the derivative output.

The operations performed by predictor 61 on the $u(t)$ signal on channel 21 are similar to the operations performed by predictor 59. The approximate Laplace transform $(k+T_1s)$ is implemented by predictor 61 to obtain the $u_p$ signal on channel 67 $[u_p = ku(t) + T_1\dot{u}(t)]$. Conventional operational amplifier 195, capacitors C9 and C10, and resistors R11, R12, and R13 comprise a standard augmented differentiator with a double high frequency cutoff, whose output is the sum of the input and its first derivative, and whose input is relatively insensitive to high frequency noise. The ratio of resistors R13 and R12 establishes the amplification factor $k$ applied by amplifier 195 to the $u(t)$ signal on channel 21. The time constant formed by resistor R13 and capacitor C9 specifies the prediction interval $T_1$. Resistor R11 connected to capacitor C9 limits the high frequency response of predictor 61, and capacitor C10 shunting resistor R13 doubles the amount of attenuation of input frequencies higher than this limit, with both effects combining to render predictor 61 insensitive to high frequency noise which could mask the derivative output.

The predicted error signal $e_p$ (the signal on channel 65) is then operated on by sign detector 60, consisting of zero-crossing detector 107 and output buffer 108, to obtain the required binary sgn $e_p$, the signal on channel 66. Sign information is extracted from $e_p$, the signal on channel 65, by emitter-coupled clippers 191 and 192, and is then operated on by level changer 193 and shaper 194. In an identical manner, $u_p$, the signal on channel 67, is processed by sign detector 62, consisting of zero-crossing detector 109 and output buffer 110, to provide sgn $u_p$, the signal on channel 68. Sign information is extracted by emitter-coupled clippers 196 and 197, and then transformed to the proper binary signal by level changer 198 and shaper 199.

The signs of the predicted system error and the predicted value of the plant control signal are then processed by "reward-punish" logic 63 to form the binary V signal on channel 20. First, inverters 200 and 201 generate $\overline{\text{sgn } e_p}$ and $\overline{\text{sgn } u_p}$, respectively. AND-gate 202 then forms the logical product sgn $e_p \cdot \overline{\text{sgn } u_p}$, and AND-gate 203 forms the logical product $\overline{\text{sgn } e_p} \cdot \text{sgn } u_p$. The balance of the exclusive-OR function is performed by OR-gate 204 which forms the logical sum of logical products $$\text{sgn } e_p \cdot \overline{\text{sgn } u_p} \cup \overline{\text{sgn } e_p} \cdot \text{sgn } u_p$$

defined as V, the type II performance assessment stage 15B output parameter, the signal on channel 20.

It is apparent from the foregoing descriptions that the type I performance assessment stage 15A of FIGURES 3 and 6 and the type II performance assessment stage 15B of FIGURES 4 and 7 perform the same basic functions of continuous assessment of self-organizing control system performance based on the system error signal, $e(t)$, and both generate a "reward-punish" signal, V, based upon this assessment. Further, both types of performance assessment stage use a predictive function of system error. This predictive function need not consist of the simple tangential extrapolation described above but may employ nonlinear or higher-order linear prediction. However, tangential extrapolation, which is theoretically optimum for linear, second-order controlled plants, is adequate for linear plants of higher than second order and many nonlinear plants.

The dissimilarities between the type I and type II performance assessment stages lie in the criteria employed to generate their respective V signals, and in the resultant dependence upon, or independence of, certain characteristics of the specific controlled plant. In review, the criterion upon which type I performance assessment stage 15A bases its V signal is sgn $v = $ minus sgn $e_p \cdot $ sgn $\ddot{e}_p$, in which the sign of the predicted error is coordinated with the sign of the acceleration of predicted error. If the latter has the opposite sign from the former, a "reward" signal level is generated by stage 15A and sent to the PSV conditioning logic stage 16. Conversely, if the signs of the predicted error and the acceleration of predicted error are the same, a "punish" signal level is generated by stage 15A to guide the PSV conditioning logic. The PSV conditioning logic stage 16 then determines which direction of the plant control signal on channel 21 produced the particular "reward" or "punish" assessment. It is therefore immaterial, for this configuration of self-organizing control system, whether the controlled plant polarity ($\partial \ddot{e}_p / \partial u_p$) is positive or negative: the type I performance assessment stage 15A working in conjunction with the PSV conditioning logic stage 16 will experimentally determine this information.

As explained earlier, the type II performance assessment stage 15B bases its V signal upon the criterion sgn $v = $ minus sgn $e_p \cdot $ sgn $u_p$. This criterion was developed by making the restrictive assumption that sgn $\ddot{e}_p = $ sgn $u_p$, where $u_p = k u(t) + T_1 \dot{u}(t)$. The sign of the predicted system error is now coordinated in a fixed way with the sign of an extrapolated value of the plant control signal, $u(t)$, with an immediate advantage of less sensitive circuitry required for hardware implementation, due to elimination of differentiators 100 and 101 (FIGURE 13). As in the type I performance assessment, a "reward" signal level is generated by stage 15B if the signs of $e_p$ and $u_p$ are dissimilar and a "punish" signal level is generated if the signs of $e_p$ and $u_p$ are identical. The lack of sign information for predicted error acceleration requires that the controlled plant polarity ($\partial \ddot{e}_p / \partial u_p$) be known a priori, as this configuration of the self-organizing control system cannot determine plant polarity through experimentation. (For the purpose of this development, plant polarity was assumed to be negative; a positive polarity would require that the V signal on channel 20 be complemented.) This disadvantage is more than offset for many applications by the absence of the $\ddot{e}_p$ term in the performance assessment criterion, making operation of the self-organizing control system much less sensitive to environmental and sensor noise and to the order of the controlled plant.

As illustrated in FIGURE 1, the V ("reward-punish") signal on channel 20 generated by performance assessment stage 15 is supplied to the PSV conditioning logic stage 16. In turn, PSV conditioning logic stage 16 utilizes the V signal on channel 20 and an internally-stored history of directions of change of the $u(t)$ plant control signal on channel 21 to increment the $u(t)$ signal on channel 21. The direction of the increment of the $u(t)$ signal on channel 21 supplied to the controlled plant 12 by the self-organizing control subsystem 11 is that direction which will minimize the $e(t)$ system error signal on channel 19, resulting from a comparison of the command input signal on channel 17 and the sensed signal on channel 18 which represents the controlled plant output variable on channel 22. In brief, the PSV conditioning logic stage 16 functions as a signal generator whose output signal magnitude and sign are based on a continuous dynamic assessment of actual plant performance versus desired plant performance. The successful accomplishment of this function by the PSV conditioning logic stage 16 is due to its ability to associate cause and effect, basing its decisions on accumulated evidence concerning the present or predicted results of its past actions, thereby permitting realization of effective control even though characteristics of the controlled plant are incompletely known to the control system designer and user.

FIGURE 2 diagrammatically defines the functions comprising the PSV conditioning logic stage developed as a part of the present invention. The PSV conditioning logic stage 16 consists of: a U register 28 which, with its associated control logic 27 and digital-to-analog (D/A) converter 29, increments, stores, converts, and buffer amplifies the $u(h)$ plant control signal appearing on channel 21; a statistical source 26, whose probabilistically-biased random noise output signal on channel 38 controls the incrementation of the U register 28; a P register 24, which, with its associated control logic 23 and digital-to-analog (D/A) converter 25, generates the probability control voltage, $v_p$, the signal on channel 37, that controls the probability of the statistical source output signal on channel 38 being at the logical one or logical zero level; a sign $\Delta u(t)$ memory 30, which stores the directions of change in the $u(t)$ plant control signal on channel 21 and provides the sgn $\Delta u$ signal on channel 48 that, in conjunction with the V signal on channel 20 from a performance assessment stage 15, determines the direction of incrementation of the P register 24; and a logic time base 31, whose function is to generate the clock pulses (C1, the signal on channel 43; C2, the signal on channel 44; C3, the signal on channel 45; C4, the signal on channel 46; and C5, the signal on channel 47) which control the sequence of events associated with each increment of the $u(t)$ control signal on channel 21. In summation, the operation of the PSV conditioning logic stage 16 is such that the probabilities associated with alternative directions of change of the output variable, $u(t)$, which is the plant control signal on channel 21, are biased in favor of changes which produced desirable results, as indicated by the state of the V signal on channel 20 as generated by the performance assessment stage 15. The sequence of major events occurring during each sample period is: (1) the P register 24 is incremented, thus changing the output statistics of the statistical source 26, (2) the U register 28 is incremented in accordance with the new probabilities, and (3) the direction of the U register 28 increment is stored in the sign $\Delta u(t)$ memory 30.

The operations which comprise the PSV conditioning logic stage of FIGURE 2 are illustrated in greater detail in FIGURE 5. The P-register control logic 23, consisting of add-subtract decision logic 69 and decision memory 70, generates the ADD signal on channel 34 and the SUBTRACT signal on channel 35, which determine the direction of the increment of P register 24. Add-subtract decision logic 69 correlates the V signal on channel 20 from the performance assessment stage 15 with the sgn $\Delta u$ signal on channel 48 representing the change in the $u(t)$ signal on channel 21 which resulted in the "reward-punish" decision. The form of this correlation is such that a positive increment to the P-register 24 contents is ordered if the V signal on channel 20 indicates a "reward" and the sgn $\Delta u$ signal on channel 48 indicates the associated change in the $u(t)$ signal on channel 21 was a positive increment, or if the V signal on channel 20 indicates a "punish" and the sgn $\Delta u$ signal on channel 48 indicates the associated change in the $u(t)$ signal on channel 21 was a negative increment. Conversely, a negative increment to the P-register 24 contents is ordered if the V signal on channel 20 indicates a "reward" and the sgn $\Delta u$ signal on channel 48 indicates the associated change in the $u(t)$ signal on channel 21 was a negative increment, or if the V signal on channel 20 indicates a "punish" and the sgn $\Delta u$ signal on channel 48 indicates the associated change in the $u(t)$ signal on channel 21 was a positive increment. At the occurrence of clock pulse C1, the signal on channel 43 generated by the logic time base 31, the decision of add-subtract logic 69 is stored in decision memory 70, which provides the ADD signal on channel 34 and the subtract signal on channel 35 to the P register 24. These P-register control signals are described by the Boolean functions $$\text{ADD} = V \cdot \text{sgn}\Delta u \cup \overline{V} \cdot \overline{\text{sgn}\Delta u}$$

and $$\text{SUB} = V \cdot \overline{\text{sgn}\Delta u} \cup \overline{V} \cdot \text{sgn}\Delta u$$

The P register 24 consists of counter up-down steering logic 71 and a 3-stage reversible counter 72. The function implemented by P register 24 is that of a standard 3-bit binary up-down counter, with seven of the eight possible counter states untilized. Limit gates within counter up-down steering logic 71 monitor the contents of the 3-stage reversible counter 72 and detect the counts of one and seven. The counter up-down steering logic 71 senses the level of the ADD signal on channel 34 and the SUBTRACT signal on channel 35 at the occurrence of the clock pulse C2, the signal on channel 44 generated by the logic time base 31, and generates a COUNT-UP signal on channel 90 if the ADD signal on channel 34 is "true" and a count of seven is not detected in the 3-stage reversible counter 72. Conversely, a COUNT-DOWN signal on channel 91 is generated if the SUBTRACT signal on channel 35 is "true" and a count of one is not detected in the 3-stage reversible counter 72. If the 3-stage reversible counter 72 is in either the one state or the seven state, it remains in that state until a "true" ADD signal on channel 34 or a "true" SUBTRACT signal on channel 35, respectively, is sensed at the time of occurrence of the C2 signal on channel 44. The COUNT-UP signal on channel 90 is thus described by the Boolean function $$\text{UP} = \text{ADD} \cdot \overline{\text{CNT7}} \cdot C2$$

while the COUNT-DOWN signal 91 is described by $$\text{DOWN} = \text{SUB} \cdot \overline{\text{CNT1}} \cdot C2$$

The contents of P register 24, the signal on channel 36, are processed by D/A converter 25 to generate $v_p$, the signal on channel 37, which in turn controls the probability of the statistical source (SS) 26 output, which is the signal on channel 38, being in the logical one state or the logical zero state. A count of four in P register 24 results in a 50 percent probability that the SS output signal on channel 38 will be in the logical one state at any given instant of time, while a count of seven results in approximately a 95 percent probability that the SS output signal on channel 38 will be in the logical one state and a count of one results in approximately a 5 percent probability that the SS output signal on channel 38 will be in the logical one state. Intermediate counts in P register 24 result in intermediate probabilities for a logical one state or a logical zero state to occur at the SS output at any given instant of time. Although an approximately linear relationship between the contents of P register 24 and the probability of the SS output signal on channel 38 being in the logical one state was implemented in the invention herein described, a linear relationship is not required. The operation of PSV conditioning logic 16 and the self-organizing control system could be improved by appropriate nonlinearities in the relationship, although the benefits from this are slight. The chief restriction is that any positive increment in P-register 24 contents must result in an increase in probability of a logical one state and any negative increment in P-register contents must result in a decrease in probability of a logical one state.

The D/A converter 25 consists of precision bit-weight resistors 73 and operational amplifier 74. The actual D/A conversion is performed by precision bit-weight resistors 73, which comprise a standard resistive summation network. One end of a precision resistor is connected to the "true" output of each counter stage of the P register 24, and the other ends of the resistors are tied in common, forming a summation point. Since the value of each of the precision resistors differs from the value of adjacent resistors by a power of two, with the lowest value connected to the most significant bit and the highest value connected to the least significant bit of P register 24, the summation point provides an analog voltage level, the signal on channel 92, accurately represents the contents of P register 24. This analog voltage level is then amplified by operational amplifier 74 to provide the bipolar probability control voltage, $v_p$, the signal on channel 37, applied to the statistical source 26.

Basically, the statistical source 26 is a signal generator whose output, $n_r(p)$, the signal on channel 38, is a probabilistically-biased random sequence of logical ones and logical zeroes. The statistical source consists of a random noise generator 76, a threshold comparator 75, and an output buffer 77. The random noise generator 76 generates a random noise output, $n_r$, the signal on channel 93, with an approximately Gaussion distribution. The threshold comparator 75 then compares the random noise, signal, $n_r$, on channel 93, with the probability control voltage, $v_p$, the signal on channel 37, to generate a random binary sequence having a duty cycle (ratio of the number of logical ones to logical zeroes occurring over a statistically-meaningful period of time) which is in direct proportion to the magnitude and polarity of $v_p$, the signal on channel 37. A probability control voltage of zero (P-register 24 contents equal four) results in a duty cycle of approximately 50 percent, while a maximum negative voltage (P-register 24 contents equal seven) results in a duty cycle of approximately 95 percent and a maximum positive voltage (P-register 24 contents equal one) results in a duty cycle of approximately 5 percent.

An output buffer 77 then transforms this probabilistically-biased signal to levels compatible with the logic gates of the U-register control logic 27, thereby providing the statistical source output, $n_r(p)$, the signal on channel 38, which consists of a random sequence of logical ones and logical zeroes with a probabilistically-controlled duty cycle.

The U-register control logic 27, consisting of add-subtract decision logic and memory 78, generates an ADD signal on channel 39 and a SUBTRACT signal on channel 40 which determine the direction of each increment of U-register 28 contents. The add-subtract devisions are based chiefly upon the instantaneous state of $n_r(p)$, the signal on channel 38. At the occurrence of clock pulse C3, the signal on channel 45 generated by the logic time base 31, the state of the $n_r(p)$ signal on channel 38 is sampled, and the resultant add or subtract decision is stored in a short-term devision memory. The ADD signal on channel 39 is in the "true" state if the $n_r(p)$ signal on channel 38 was a logical one, and the SUBTRACT signal on channel 40 is in the "true" state if the $n_r(p)$ signal on channel 38 was a logical zero. Thus, it is seen that the direction of the U-register 28 increment is random, with a statistical bias dependent upon the instantaneous state of statistical source 26. That is, the probability of a positive or a negative increment of U-register 28 contents is a function of the probability control voltage, the signal on channel 37.

The U register 28 consists of counter up-down steering logic 79 and a 4-stage reversible counter 80. The function implemented by U register 28 is that of a standard 4-bit binary up-down counter, with fifteen of the sixteen possible counter states utilized. Limit gates within counter up-down steering logic 79 monitor the contents of 4-stage reversible counter 80 and detect the counts of one and fifteen. The counter up-down steering logic 79 senses the levels of the ADD signal on channel 39 and the SUBTRACT signal on channel 40 at the occurrence of clock pulse C4, the signal on channel 46 generated by the logic time base 31, and generates a COUNT-UP signal on channel 94 if the ADD signal on channel 39 is "true" and if a count of fifteen is not detected in the 4-stage reversible counter 80. Conversely, a COUNT-DOWN signal on channel 95 is generated if the SUBTRACT signal on channel 40 is "true" and if a count of one is not detected in the 4-stage reversible counter 80. If the 4-stage reversible counter 80 is in either the one state or the fifteen state, it remains in that state until a "true" ADD signal on channel 39 or a "true" SUBTRACT signal on channel 40, respectively, is sensed at the time of occurrence of C4, the signal on channel 46. The COUNT-UP signal on channel 94 is described by the Boolean function $$UP = ADD \cdot \overline{CNT15} \cdot C4$$

while the COUNT-DOWN signal on channel 95 is described by $$DOWN = SUB \cdot \overline{CNT1} \cdot C4$$

The contents of U register 28, the signal on channel 41, are processed by D/A converter 29 to generate the $u(t)$ plant control signal on channel 21 and its inverse, the $-u(t)$ signal on channel 42. The $u(t)$ signal on channel 21 is fed directly to the controlled plant 12, and both the $u(t)$ signal on channel 21 and the $-u(t)$ signal on channel 42 are used by the sign $\Delta u(t)$ memory 30 to derive the direction of change of the $u(t)$ plant control signal on channel 21, which is then stored for subsequent use in determining required changes in the control system statistical bias. The D/A converter 29 consists of precision bit-weight resistors 81 and inverting operational amplifiers 82 and 83.

The actual D/A conversion is performed by precision bit-weight resistors 81, which comprise a standard resistive summation network. One end of a precision resistor is connected to the "true" output of each counter stage of the U register 28, and the other ends of the resistors are tied in common, forming a summation point. Since the value of each of the precision resistors differs from the value of adjacent resistors by a power of two, with the lowest value connected to the most significant bit and the highest value connected to the least significant bit of U register 28, the summation point provides an analog voltage level, the signal on channel 96, that accurately represents the contents of U register 28. This analog voltage level is then amplified by inverting operational amplifier 82 to provide the bipolar plant control signal, $u(t)$, the signal on channel 21. Another inverting operational amplifier 83 in series operates on the $u(t)$ signal on channel 21 with a unity amplification factor to provide the inverse signal, $-u(t)$, the signal on channel 42.

The sign $\Delta u(t)$ memory 30, consisting of slope detectors 84 and 85, sgn $\Delta u$ temporary memory 86, and 4-stage shift register 87, monitors the $u(t)$ signal on channel 21 and the $-u(t)$ signal on channel 42 to determine the current direction of the increment, if any, of U-register 28 contents and then stores the direction of the increment, sgn $\Delta u$, the signal on channel 48, in a register that always contains the direction of the four recent increments. The slope detector 84 monitors the $u(t)$ signal on channel 21 and detects a positive transition in the signal to generate a pulse, the signal on channel 97, which indicates the current sgn $\Delta u$ was positive. In a like manner, slope detector 85 monitors the $-u(t)$ signal on channel 42 (the inverse of the $u(t)$ signal on channel 21) and detects a positive transition in the signal to generate a pulse, the signal on channel 98, which indicates the current sgn $\Delta u$ was negative. The pulse appearing on channel 97 or 98, indicating that sgn $\Delta u$ was positive or negative, respectively, sets or resets sgn $\Delta u$ temporary memory 86. Then, at the occurrence of clock pulse C5, the signal on channel 47 generated by the logic time base 31, the sgn $\Delta u$ information in sgn $\Delta u$ temporary memory 86 is transferred to a 4-stage shift register 87. At the beginning of any sample period $t$, the 4-stage shift register 87 contains, in stages 1–4, the sgn $\Delta u$ information for sample periods $t-1$, $t-2$, $t-3$, and $t-4$, respectively. The sgn $\Delta u$ delay select 32 determines from which register stage the sgn $\Delta u$ signal on channel 48 is obtained; i.e., to which prior sample period the sgn $\Delta u$ information pertains. In this disclosure, a sgn $\Delta u$ signal on channel 48 equal to logical one indicates a positive increment in the $u(t)$ signal on channel 21, and a sgn $\Delta u$ signal on channel 48 equal to logical zero indicates a negative increment in the $u(t)$ signal on channel 21.

The proper sequence of events within each sample period is maintained by the logic time base 31, which generates clock pulses C1, the signal on channel 43; C2, the signal on channel 44; C3, the signal on channel 45; C4, the signal on channel 46; and C5, the signal on channel 47. A standard transistor oscillator 88 establishes the sample period repetition rate which may be varied by the sample rate control 33. The output signal on channel 99 of the oscillator 88 is delayed by varied amounts and shaped by the clock pulse delay and shaping network 89 to generate the sequential clock pulses. Although the logic time base described in this disclosure generates sample periods occurring at regular intervals of time, the self-organizing control system of this invention could as well incorporate an aperiodic or random logic time base, without regular time-spacing of sample periods and without set time intervals between the clock pulses in any given sample period. The only requirement is to provide C1, the signal on channel 43; C2, the signal on channel 44; C3, the signal on channel 45; C4, the signal on channel 46; and C5, the signal on channel 47, in the proper sequence as described in this disclosure.

The generalized electrical circuits and the circuit interconnections of the PSV conditioning logic 16 of FIG- URES 2 and 5 are detailed by the functional schematics of FIGURES 8 through 12. Specific component values and supply voltages are not shown since they are unique to the characteristics of a given controlled plant and to the characteristics of the components (such as the operational amplifiers, logic gates, and transistors) used for hardware implementation of the functional schematics. FIGURE 8 illustrates the functional schematic of P-register control logic 23, P register 24, and D/A converter 25. FIGURE 9 illustrates the functional schematic of statistical source 26. FIGURE 10 illustrates the functional schematic of U-register control logic 27, U register 28, and D/A converter 29. FIGURE 11 illustrates the functional schematic of sign $\Delta u(t)$ memory 30. FIGURE 12 illustrates the functional schematic of logic time base 31.

As illustrated in the functional schematic of FIGURE 8, the P-register control logic 29, consisting of add-subtract decision logic 69 and decision memory 70, generates the ADD signal on channel 34 and the SUBTRACT signal on channel 35, based upon the correlation of the V signal on channel 20 from the performance assessment stage 15 and the sgn $\Delta u$ signal on channel 48 from the sign $\Delta u(t)$ memory 30. The add or subtract decision is made by add-subtract decision logic 69. First, inverters 111 and 112 generate $\overline{V}$ and $\overline{\text{sgn } \Delta u}$, respectively. AND-gate 113 then forms the logical product $V \cdot \text{sgn } \Delta u$, and AND-gate 114 forms the logical product $\overline{V} \cdot \overline{\text{sgn } \Delta u}$. The balance of the inclusive-OR function is performed by OR-gate 117 which forms the logical sum of logical products, $V \cdot \text{sgn } \Delta u \cup \overline{V} \cdot \overline{\text{sgn } \Delta u}$, defined as the add decision. At the same time, AND-gate 115 forms the logical product $V \cdot \overline{\text{sgn } \Delta u}$, and AND-gate 116 forms the logical product $\overline{V} \cdot \text{sgn } \Delta u$. The balance of the exclusive-OR function is performed by OR-gate 118 which forms the logical sum of logical products, $V \cdot \overline{\text{sgn } \Delta u} \cup \overline{V} \cdot \text{sgn } \Delta u$, defined as the subtract decision. A standard J-K flip-flop comprises decision memory 70, with the add decision output signal of OR-gate 117 applied to the set-logic input, and the subtract decision output signal of OR-gate 118 applied to the reset-logic input. At the occurrence of clock pulse C1, the signal on channel 43, at the trigger input, decision memory 70 assumes either the set or the reset state, dependent upon the existence of an add or a subtract decision. The ADD signal on channel 34, which occurs at the set output of decision memory 70, thus may be expressed as the Boolean function $$\text{ADD} = V \cdot \text{sgn } \Delta u \cup \overline{V} \cdot \overline{\text{sgn } \Delta u}$$

while the SUBTRACT signal on channel 35, which occurs at the reset output of decision memory 70, may be expressed as the Boolean function $$\text{SUB} = V \cdot \overline{\text{sgn } \Delta u} \cup \overline{V} \cdot \text{sgn } \Delta u$$

The functional schematic of FIGURE 8 depicts P register 24 as the counter up-down steering logic 71 and the 3-stage reversible counter 72, which comprise a standard 3-bit binary up-down counter employing a ripple-through count propagation based on intermediate differentiating networks. The counter up-down steering logic 71 consists of count pulse formation AND-gates 119 and 120, and counter limit AND-gates 121 and 122. The three bits, A, B, and C, of 3-stage reversible counter 72 (with bit A as the least significant bit) consist of standard J-K flip-flops 124, 128, and 132, respectively. Counter limit AND-gate 121 monitors the set outputs of bits A, B, and C, to detect the count of seven in P register 24, and to form the logical product $A \cdot B \cdot C$, or CNT 7, which acts as in inhibiting input to AND-gate 119. In a similar manner, counter limit AND-gate 122 monitors the set output of bit A and the reset outputs of bits B and C, to detect the count of one in P register 24, and to form the logical product $A \cdot \overline{B} \cdot \overline{C}$, or CNT 1, which acts as an inhibiting input to AND-gate 120. AND-gate 119 is strobed by C2, the signal on channel 44, to form a COUNT-UP pulse if the ADD signal on channel 34 is "true" and if the inhibiting input CNT 7 is "not true." The COUNT-UP signal on channel 90 formed by AND-gate 119 is thus described by the Boolean function $\text{ADD} \cdot \overline{\text{CNT7}} \cdot C2$. Likewise, AND-gate 120 is strobed by C2, the signal on channel 44, to form a COUNT-DOWN pulse if the SUBTRACT signal on channel 35 is "true" and if the inhibiting input CNT 1 is "not true." The COUNT-DOWN signal on channel 91, formed by AND-gate 120, is thus described by the Boolean function $\text{SUB} \cdot \overline{\text{CNT 1}} \cdot C2$.

The three standard J-K flip-flops which form bits A, B, and C of 3-stage reversible counter 72 each have the set output tied to the reset-logic input and the reset output tied to the set-logic input, thus allowing a change of state to occur whenever a pulse occurs at the trigger input. The trigger input pulse for flip-flop 124 (bit A) is formed by OR-gate 123 which forms the logical sum of the COUNT-UP signal on channel 90 and the COUNT-DOWN signal on channel 91. Thus, bit A changes state at the occurrence of C2, the signal on channel 44, for either an add or a subtract decision, provided P register 24 is not in either of its two limit states, one and seven. The trigger input pulse for flip-flop 128 (bit B) is provided by OR-gate 127 which forms the logical sum of the outputs of AND-gate 125 and 126. Differentiating network $R_aC_a$ forms a pulse when the reset output of flip-flop 124 (bit A) changes from the logical zero state to the logical one state. AND-gate 125 then forms the logical product of this pulse and the COUNT-UP signal on channel 90. Similarly, differentiating network $R_bC_b$ forms a pulse when the set output of flip-flop 124 (bit A) changes from the logical zero state to the logical one state, and AND-gate 126 then forms the logical product of this pulse and the COUNT-DOWN signal on channel 91. Thus, flip-flop 128 (bit B) changes state whenever flip-flop 124 (bit A) assumes the reset state in response to a COUNT-UP pulse or assumes the set state in response to a COUNT-DOWN pulse. The trigger input pulse for flip-flop 132 (bit C) is provided by OR-gate 131 which forms the logical sum of the outputs of AND-gates 129 and 130. Differentiating network $R_cC_c$ forms a pulse when the reset output of flip-flop 128 (bit B) changes from the logical zero state to the logical one state. AND-gate 129 then forms the logical product of this pulse and the COUNT-UP signal on channel 90. Likewise, differentiating network $R_dC_d$ forms a pulse when the set output of flip-flop 128 (bit B) changes from the logical zero state to the logical one state, and AND-gate 130 then forms the logical product of this pulse and the COUNT-DOWN signal on channel 91. Thus, flip-flop 132 (bit C) changes state whenever flip-flop 128 (bit B) assumes the reset state as the result of a COUNT-UP pulse or assumes the set state as the result of a COUNT-DOWN pulse. It is seen from the above description that counter up-down steering logic 71 and 3-stage reversible counter 72 comprise a standard 3-bit binary up-down counter employing ripple-through count propagation.

FIGURE 8 also shows that the contents of P register 24 are processed by D/A converter 25, consisting of precision bit-weight resistors 73 and operational amplifier 74, to generate the statistical source probability control voltage, $v_p$, the signal on channel 37. Precision resistor $R_x$, which is connected to the set output of flip-flop 132 (bit C of P register 24); resistor $2R_x$, which is connected to the set output of flip-flop 128 (bit B of P register 24); and resistor $4R_x$, which is connected to the set output of flip-flop 124 (bit A of P register 24), form a standard resistive summation network. Due to the ratio of the values of the precision resistors, the voltage level at the summation point (the signal on channel 92) represents an accurate digital-to-analog conversion of the contents of P register 24. This analog voltage level is then amplified by standard operational amplifier 74 to form the bipolar $v_p$ signal on channel 37. Resistor $R_e$ provides feedback to insure a stable amplification factor. Capacitor C compensates for the amplifier input capacitance to prevent phase shift. As illustrated, provision is made to adjust the over-all gain of the amplification stage, and to compensate for the inherent DC offset of amplifier 74.

The generalized schematic of statistical source 26 is detailed in the functional schematic of FIGURE 9. The statistical source 26 consists of random noise generator 76, threshold comparator 75, and output buffer 77, and generates a random sequence of logical ones and logical zeroes, the $n_r(p)$ signal on channel 38, with a probabilistic duty cycle controlled by the output of P register 24, the signal on channel 37. The random noise generator 76 consists of a critically-biased Zener diode 133 which acts as a noise source with approximately Gaussian distribution, and cascaded standard linear amplifier stages 134, 135, and 136, which provide the required gain of several thousand. The output of the random noise generator 76, $n_r$, the signal on channel 93, and the $v_p$ signal on channel 37, plus a correlated secondary comparator voltage formed by inverting emitter follower 141, are then processed by threshold comparator 75, consisting of series emitter-coupled clipper stages 137, 138 and 139, 140 to generate a signal that is a random sequence of voltage excursions between high and low levels with a duty cycle in direct proportion to the magnitude and polarity of the $v_p$ signal on channel 37. The resultant signal is then operated on by level changer 142 and shaper 143 to provide the statistical source output, $n_r(p)$, the signal on channel 38, which is a random series of logical ones and logical zeroes with a probabilistically-controlled duty cycle.

FIGURE 10 detals the generalized schematic of U-register control logic 27, U register 28, and D/A converter 29. The add-subtract decision logic and memory 78 generates the ADD signal on channel 39 and the SUBTRACT signal on channel 40 which determine the direction of the increment to the contents of U register 28, based upon the instantaneous state of the biased random signal $n_r(p)$, on channel 38. The statistical source output signal on channel 38 is applied to the set-logic input, and its complement (formed by inverter 144) is applied to the reset-logic input, of a standard J-K flip-flop 145. At the occurrence of clock pulse C3, the signal on channel 45, at the trigger input, flip-flop 145 assumes either the set or reset state, dependent upon the instantaneous state of the statistical source output signal. The ADD signal on channel 39, which occurs at the set output of flip-flop 145, is a logical one if the instantaneous state of the $n_r(p)$ signal on channel 38 was a logical one. Conversely, the SUBTRACT signal on channel 40, which occurs at the reset output of flip-flop 145, is a logical one of the instantaneous state if the $n_r(p)$ signal on channel 38 was a logical zero.

The functional schematic of FIGURE 10 depicts U register 28 as the counter up-down steering logic 79 and the 4-stage reversible counter 80, which comprise a standard 4-bit binary up-down counter employing a ripple-through count propagation based on intermediate differentiating networks. The counter up-down steering logic 79 consists of count pulse formation AND-gates 146 and 147, and counter limit AND-gates 148 and 149. The four bits, A, B, C, and D of 4-stage reversible counter 80 (with bit A as the least significant bit) consist of standard J-K flip-flops 151, 155, 159, and 163, respectively. Counter limit AND-gate 148 monitors the set outputs of bits A, B, C, and D, to detect the count of fifteen in U register 28, and to form the logical product $A \cdot B \cdot C \cdot D$, or the CNT 15 signal on channel 164, which acts as an inhibiting input to AND-gate 146. In a similar manner, counter limit AND-gate 149 monitors the set output of bit A and the reset outputs of bits B, C, and D, to detect the count of one in U register 28, and to form the logical product $A \cdot \overline{B} \cdot \overline{C} \cdot \overline{D}$, or the CNT 1 signal on channel 165, which acts as an inhibiting input to AND-gate 147. AND-gate 146 is strobed by C4, the signal on channel 46, to form a COUNT-UP pulse if the ADD signal on channel 39 is "true" and if the inhibiting input, the CNT 15 signal on channel 164, is "not true." The COUNT-UP signal on channel 94 formed by AND-gate 146 is thus described by the Boolean function ADD·$\overline{\text{CNT 15}}$·C4. Likewise, AND-gate 147 is strobed by C4, the signal on channel 46, to form a COUNT-DOWN PULSE if the SUBTRACT signal on channel 40 is "true" and if the inhibiting input, the CNT 1 signal on channel 165, is "not true". The COUNT-DOWN signal on channel 95 formed by AND-gate 147 is thus described by the Boolean function SUB·$\overline{\text{CNT 1}}$·C4.

The four standard J-K flip-flops which form bits A, B, C, and D of 4-stage reversible counter 80 each have the set output tied to the reset-logic input and the reset output tied to the set-logic input, thus allowing a change of state to occur whenever a pulse occurs at the trigger input. The trigger input pulse for flip-flop 151 (bit A) is formed by OR-gate 150 which forms the logical sum of the COUNT-UP signal on channel 94 and the COUNT-DOWN signal on channel 95. Thus, bit A changes state at the occurrence of C4, the signal on channel 46, for either an add or subtract decision, provided U register 28 is not in either of its two limit states, one and fifteen. The trigger input pulse for flip-flop 155 (bit B) is provided by OR-gate 154 which forms the logical sum of the outputs of AND-gates 152 and 153. Differentiating network $R_fC_f$ forms a pulse when the reset output of flip-flop 151 (bit A) changes from the logcal zero state to the logical one state. AND-gate 152 then forms the logical product of this pulse and the COUNT-UP signal on channel 94. Similarly, differentiating network $R_gC_g$ forms a pulse when the set output of flip-flop 151 (bit A) changes from the logical zero state to the logical one state, and AND-gate 153 then forms the logical product of this pulse and the COUNT-DOWN signal on channel 95. Thus, flip-flop 155 (bit B) changes state whenever flip-flop 151 (bit A) assumes the reset state in response to a COUNT-UP pulse or assumes the set state in response to a COUNT-DOWN pulse. The trigger input pulse for flip-flop 159 (bit C) is provided by OR-gate 158 which forms the logical sum of the outputs of AND-gates 156 and 157. Differentiating network $R_hC_h$ forms a pulse when the reset output of flip-flop 155 (bit B) changes from the logical zero state to the logical one state. AND-gate 156 then forms the logical product of this pulse and the COUNT-UP signal on channel 94. Likewise, differentiating network $R_iC_i$ forms a pulse when the set output of flip-flop 155 (bit B) changes from the logical zero state to the logical one state, and AND-gate 157 then forms the logical product of this pulse and the COUNT-DOWN signal on channel 95. Thus, flip-flop 159 (bit C) changes state whenever flip-flop 155 (bit B) assumes the reset state as the result of a COUNT-UP pulse or assumes the set state as the result of a COUNT-DOWN pulse. The trigger input pulse for flip-flop 163 (bit D) is provided by OR-gate 162 which forms the logical sum of the outputs of AND-gates 160 and 161. Differentiating network $R_jC_j$ forms a pulse when the reset output of flip-flop 159 (bit C) changes from the logical zero state to the logical one state. AND-gate 160 then forms the logical product of this pulse and the COUNT-UP signal on channel 94. Likewise, differentiating network $R_kC_k$ forms a pulse when the set output of flip-flop 159 (bit C) changes from the logical zero state to the logical one state, and AND-gate 161 then forms the logical product of this pulse and the COUNT-DOWN signal on channel 95. Thus, flip-flop 163 (bit D) changes state whenever flip-flop 159 (bit C) assumes the reset state as the result of a COUNT-UP pulse or assumes the set state as the result of a COUNT-DOWN pulse. It is seen from the above description that counter up-down steering logic 79 and 4-stage reversible counter 80 comprise a standard 4-bit binary up-down counter employing ripple-through count propagation.

FIGURE 10 also shows that the contents of U register 28 are processed by D/A converter 29, consisting of precision bit-weight resistors 81 and inverting operational amplifiers 82 and 83, to generate the $u(t)$ plant control signal on channel 21 and its inverse, the $-u(t)$ signal on channel 42. Precision resistor $R_y$, which is connected to the set output of flip-flop 163 (bit D of U register 28); resistor $2R_y$, which is connected to the set output of flip-flop 159 (bit C of U register 28); resistor $4R_y$, which is connected to the set output of flip-flop 155 (bit B of U register 28); and resistor $8R_y$, which is connected to the set output of flip-flop 151 (bit A of U register 28) form a standard resistive summation network. Due to the ratio of the values of the precision resistors, the voltage level at the summation point, the signal on channel 96, represents an accurate digital-to-analog conversion of the contents of U register 28. This analog voltage level is then amplified by standard inverting operational amplifier 82 to form the bipolar $u(t)$ signal on channel 21. Resistor $R_1$ provides feedback to insure a stable amplification factor. Capacitor $C_1$ compensates for the amplifier input capacitance to prevent phase shift. Standard inverting operational amplifier 83 then processes the $u(t)$ signal on channel 21 with a nominal unity amplification factor to provide an inverse signal, the $-u(t)$ signal on channel 42. Resistor $R_m$ provides feedback to insure a stable amplification factor, and capacitor $C_m$ compensates for the amplifier input capacitance to prevent phase shift. As illustrated, both amplifier stages incorporate provisions to adjust the overall gain of the stages and to compensate for the inherent DC offset of the operational amplifiers.

The generalized schematic of the sign $\Delta u(t)$ memory 30 (consisting of slope detectors 84 and 85, sgn $\Delta u$ temporary memory 86, and 4-stage shift register 87) is illustrated in FIGURE 11. The sign $\Delta u(t)$ memory 30 monitors the u(t) signal on channel 21 and the $-u(t)$ signal on channel 42 to determine the current direction of any increment to the contents of U register 28 and then stores the direction of the increment, sgn $\Delta u$, the signal on channel 48, in a register that always contains the direction of the four most recent increments. The $u(t)$ signal on channel 21 is monitored by slope detector 84 which detects a positive transition in the signal and generates a pulse, the signal on channel 97, indicating the current sgn $\Delta u$ was positive. In a like manner, slope detector 85 monitors the $-u(t)$ signal on channel 42 (the inverse of the $u(t)$ signal on channel 21) and detects a positive transition in the signal to generate a pulse, the signal on channel 98, which indicates the current sgn $\Delta u$ was negative. Sgn $\Delta u$ temporary memory 86 consists of a standard R-S flip-flop whose set input is connected to the output of slope detector 84, and whose reset input is connected to the output of slope detector 85. Thus, for each increment of U register 28, a pulse (either the signal on channel 97 or the signal on channel 98) will occur to set or reset flip-flop 86, which in turn provides memory of which pulse sense occurred last. A "true" level at the set output of flip-flop 86 (sgn $\Delta u$) indicates the direction of the last increment was positive, while a "true" level at the reset output of flip-flop 86 ($\overline{\text{sgn } \Delta u}$) indicates the direction of the last increment was negative. The 4-stage shift register 87 consists of standard J-K flip-flops 87A, 87B, 87C, and 87D. The set-logic input and reset-logic input of flip-flop 87A are connected to the set output and reset output of flip-flop 86, respectively. In flip-flop 87B, 87C, and 87D, the set-logic input is connected to the set output of the preceding stage, and the reset-logic input is connected to the reset output of the preceding stage. Thus, at the occurrence of clock pulses C5, the signal on channel 47 generated by logic time base 31, the sgn $\Delta u$ information contained in sgn $\Delta u$ temporary memory 86 is stored in flip-flop 87A, the information in flip-flop 87A is transferred to flip-flop 87B, the information in flip-flop 87B is transferred to flip-flop 87C, the information in flip-flop 87C is transferred to flip-flop 87D, and the information in flip-flop 87D is destroyed. Therefore, it is seen that, at the beginning of any sample period $t$, the 4-stage shift register 87 contains (in flip-flops 87A, 87B, 87C, and 87D) the sign $\Delta u$ information for sample periods $t-1$, $t-2$, $t-3$, and $t-4$, respectively. As illustrated, sgn $\Delta u$ delay select 32 determines to which prior sample period the sgn $\Delta u$ information on channel 48 pertains. In this disclosure, a logical one state of the signal on channel 48 indicates a positive increment in the $u(t)$ signal on channel 21, and a logical zero state of the signal on channel 48 indicates a negative increment in the $u(t)$ signal on channel 21.

FIGURE 12 depicts the generalized schematic of the logic time base 31, consisting of oscillator 88 and clock pulse delay and shaping network 89, which maintains the proper sequence of events within each sample period. The sample period repetition rate is established by a standard unijunction transistor oscillator 88A, whose frequency may be varied by the sample rate control 33. Preshaping of the basic oscillator output is accomplished by saturated switching transistor 88B to provide a logic-compatible output, the signal on channel 99. The output of the unijunction transistor oscillator 88, the signal on channel 99, is then processed by clock pulse delay and shaping network 89 to generate the required five sequential clock pulses: C1, the signal on channel 43; C2, signal on channel 44; C3, the signal on channel 45; C4, the signal on channel 46; and C5, the signal on channel 47. The signal on channel 99 is first further shaped and then inverted by inverter 166 to generate C1, the signal on channel 43. Differentiating networks $R_nC_n$ and $R_oC_o$ in conjunction with OR-gate 167 act in the C1 signal on channel 43 to produce a signal delay with respect to C1 by an amount determined by the time constant $R_nC_n$ and having a pulse width determined by the time constant $R_oC_o$. This new signal is then shaped by non-inverting gate 168 to generate C2, the signal on channel 44. Similarly, differentiating networks $R_pC_p$ and $R_qC_q$ in conjunction with OR-gate 169 act on the C2 signal on channel 44 to produce a signal delayed with respect to C2 by an amount determined by the time constant $R_pC_p$ and having a pulse width determined by time constant $R_qC_q$. This new signal is then shaped by non-inverting gate 170 to generate C3, the signal on channel 45. Likewise, differentiating networks $R_rC_r$ and $R_sC_s$ in conjunction with OR-gate 171 act on the C3 signal on channel 45 to produce a signal delayed with respect to C3 by an amount determined by the time constant $R_rC_r$ and having a pulse width determined by time constant $R_sC_s$. This new signal is then shaped by non-inverting gate 172 to generate C4, the signal on channel 46. Differentiating network $R_tC_t$ in conjunction with non-inverting gate 173 acts on the C4 signal on channel 46 to generate C5, the signal on channel 47, having a delay with respect to C4 and a pulse width that are both determined by time consant $R_rC_t$. Care must be exercised when selecting all logic time base time constants to avoid the generation of overlapping clock pulses. As aforementioned, the sample rate input for clock pulse delay and shaping network 89 could as easily be an aperiodic or random rate as the periodic output of oscillator 88, with the sole restriction that the C5 pulse on channel 47 shall be completed prior to the initiation of a new sample period.

A block diagram of a typical self-organizing control system consisting of a multiple-variable controlled plant and of a plurality of PSV conditioning logic stages operating in conjunction with a type I performance assessment stage is depicted in FIGURE 15. This diagram illustrates an application of the PSV conditioning logic stage 16 and the performance assessment stage 15A (as described in this disclosure) to the control of a multiple-variable plant. The controlled plant 210 requires a control regulating signal, $u_i$, ($i=1, 2 \ldots n$), for each of $n$ plant actuation channels. Each control regulating signal is formed by a weighted, algebraic summing amplifier 209, whose inputs are the output variables, $u_j(t)$, ($j=1, 2 \ldots 1$), of 1 PSV conditioning logic stages 16. Forming the $n$ plant control signals with each of 1 PSV conditioning logic stages 16 in parallel provides a greater dynamic range of the plant control variable, as well as enhancing system reliability. A single value signal, V, generated by a type I performance assessment stage 15A, is applied in parallel to all PSV conditioning logic stages 16, based on the assessment of a summation of weighted, absolute system error signals, $W_i|e_i|$. The command input signals, $CI_i$, are correlated in difference amplifiers 205 with the multiple plant response feedback loops, $PRFL_i$, to form the system error signals, $e_i$. The absolute value of each system error signal is computed by an absolute value stage 206. The resultant absolute value of each system error signal, $|e_i|$, is then weighted by a scaling amplifier 207 to form the weighted, absolute value of system error signal, $W_i|e_i|$. An algebraic summing amplifier 208 then forms the over-all system error signal $$\sum_{i=1}^{i=m} W_i|e|$$

upon which the type I performance assessment stage 15A bases its evaluation of system performance.

Three distinct hardware configurations of the novel and improved self-organizing control system were perfected during reduction to practice of the invention presented in this disclosure. These configurations are described briefly below to illustrate the hardware characteristics of self-organizing control systems utilizing the present invention and to indicate the type of modifications within the spirit of the invention that may occur to those skilled in the art.

The first two configurations consisted of packaging the performance assessment stage 15 and the PSV conditioning logic stage 16 as separate functional modules that would plug into a main system chassis which mounted the required power supplies and system controls. In both configurations, the same type of electronic components (i.e., operational amplifiers, logic stages, and transistors) were utiilzed. The standard operational amplifiers used in these two implementations were Model PP65AU Solid State Differential Operational Amplifiers manufactured by George A. Philbrick Researches, Inc., Allied Drive at Route 128, Dedham, Mass. The standard logic stages used were Fairchild Planar Epitaxial Micrologic Industrial Microcircuits (silicon monolithic RTL logic in TO-5 cases) manufactured by Fairchild Semiconductor, a division of Fairchild Camera and Instrument Corporation, 313 Fairchild Drive, Mountain View, Calif., and included the following:

F$\mu$L90029: medium power buffer element
F$\mu$L90329: medium power 3-input gate element
F$\mu$L91129: low power 4-input gate element
F$\mu$L91429: medium power dual 2-input gate element
F$\mu$L91529: medium power dual 3-input gate element
F$\mu$L92329: medium power J–K flip-flop element The PNP transistors used were type 2N3638 manufactured by Fairchild Semiconductor, a division of Fairchild Camera and Instrument Corporation, 313 Fairchild Drive, Mountain View, Calif. The NPN transistors used were type 2N1304 manufactured by Texas Instruments Incorporated, Semiconductor Components Division, Post Office Box 5012, Dallas, Tex. The unijunction transistor used in logic time base 31 was a type 2N489 manufactured by General Electric Company, Semiconductor Products Department, Electronics Park, Syracuse, N.Y. The Zener diode used as an initial noise source in statistical source 26 was a type 1N757 manufactured by Texas Instruments Incorporated, Semiconductor Components Division, Post Office Box 5012, Dallas, Tex. The micrologic power supply ($E_{cc}=3.0$ volts) used was a Model M–3.0–3.0A Modular Power Supply manufactured by Technipower Incorporated, a subsidiary of Benrus Watch Company, Inc., 18 Marshall St., South Norwalk, Conn. The amplifier power supply ($+V=15.0$ volts, $-V=15.0$ volts) used was a Model PR–300C Compound Regulated Dual Power Supply manufactured by George A. Philbrick Researches, Inc., Allied Drive at Route 128, Dedham, Mass.

In the first configuration, the complete circuitry for the type I performance assessment stage 15A was mounted on a printed circuit board, measuring approximately 6 x 9 inches, which was then contained in a modular plug-in chassis having a front panel on the order of 3 x 7 inches. The complete circuitry for the PSV conditioning logic stage 16 was mounted on two printed circuit boards, each measuring approximately 6 x 9 inches, which were then contained in a modular plug-in chassis having a front panel on the order of 3 x 7 inches. In this first hardware implementation of the present invention, the high amplification factor required in the random noise generator 76 was provided by two operational amplifiers.

In the second configuration, the complete circuitry for three complete and independent type II performance assessment stages 15B was contained on three plug-in printed circuit boards mounted in a modular plug-in enclosure 7 inches high, 4 inches wide, and 6¾ inches deep. The complete PSV conditioning logic stage 16 circuitry was contained on four plug-in printed circuit boards mounted in a modular plug-in enclosure 7 inches high, 4 inches wide, and 6¾ inches deep. In this second-generation hardware implementation of the present invention, discrete components were utilized to implement the generalized schematic of the random noise generator 76 as illustrated in FIGURE 9.

The third configuration of the novel and improved self-organizing control system described in this disclosure resulted from an attempt to achieve closer to the minimum volume for a system consisting of one type II performance assessment stage 15B and one PSV conditioning logic stage 16. The operational amplifiers used were SN524A General-Purpose Operational Amplifiers (integrated circuits packaged in a flat-back configuration) manufactured by Texas Instruments Incorporated, Semiconductor Components Division, Post Office Box 5012, Dallas, Tex. The standard logic stages utilized were Series 73 Solid Circuit Semiconductor Networks (modified-DTL integrated logic in flat-back cases) manufactured by Texas Instruments Incorporated, Semiconductor Components Division, Post Office Box 5012, Dallas, Tex., and, included the following:

SN7302: dual J-K flip-flop with preset
SN7311: dual 5-input NAND/NOR gate
SN7330: dual 3-input NAND/NOR gate
SN7350: quadruple inverter/driver
SN7360: quadruple 2-input NAND/NOR gate
SN7370: dual exclusive-OR gate The PNP, NPN, and unijunction transistors, and the Zener diode were the same as used in the two earlier configurations. A packaging concept utilizing small area (approximately 2½ x 2½ inches) printed circuit boards interconnected in a pseudo-cordwood modular approach resulted in the complete circuitry of one type II performance assessment stage 15B and one PSV conditioning logic stage 16 being contained in an encapsulated module approximately 3 inches high, 3 inches wide, and 4 inches deep.

While certain specific embodiments of novel and improved self-organized control systems have been disclosed in the foregoing description, it will be understood that various modifications within the spirit of the inven-

What is claimed is:

1. In a self-organizing control system: (1) a controlled plant having means for measuring at least one response variable which describes the state of the controlled plant, said controlled plant further having at least one input adapted to receive at least one regulating control signal; (2) at least one controller input summing device for receiving a command signal, said summing device generating an output signal representing a response variable error; a feedback loop connecting said means for measuring at least one response variable to the input of said summing device; and (3) means to generate said regulating control signal comprising: performance assessment means for comparing the signs of a predicted error signal and a derivative of the predicted error signal for developing a "reward-punish" reinforcement output signal in accordance with input information received thereby; means connecting the output of said summing device to the input of said performance assessment means, a conditioning logic means which develops an output regulating control signal in accordance with the logical combination of an input "reward-punish" reinforcement signal with a feedback signal representing attempted prior output signal change of said conditioning logic means; means for connecting the output signal of said performance assessment means to an input of said conditioning logic means; and a means for connecting the output of said conditioning logic means to the above-mentioned regulating control signal input of the controlled plant.

2. The self-organizing control system of claim 1, and wherein said performance assessment means includes a signal prediction means, to generate said "reward-punish" reinforcement signal output of said performance assessment means.

3. The self-organizing control system of claim 2, and wherein said performance assessment means comprises a signal-differentiating means and a means to connect said error signal to said signal-differentiating means; means to combine the output of said first differentiating means with said error signal to obtain a first resultant signal, which is a function of said error signal and its first derivative; means to connect said first resultant signal to a second differentiating means; means for connecting the output of said second differentiating means to a third differentiating means, whereby said third differentiating means generates the second derivative of said first resultant signal; and means for combining said first resultant signal and said second derivative of same, whereby said output combination means generates the above-mentioned "reward-punish" reinforcement signal output of said performance assessment means.

4. The self-organizing control system of claim 3, and wherein said output combination means incorporates a means whereby sign information is extracted from said first resultant signal; and further incorporates a means whereby sign information is extracted from said second derivative of said first resultant signal; and further incorporates a means for performing Boolean logic operations on said first resultant signal sign information and on said second derivative sign information, whereby said logic means generates the above-mentioned "reward-punish" reinforcement signal output of said performance assessment means.

5. The self-organizing control system of claim 2, and wherein said performance assessment means incorporates a signal-differentiating means and a means to connect the above-mentioned error signal to said signal-differentiating means, and further incorporates a means whereby said error signal and the output of said first differentiating means are combined to obtain a first resultant signal, which is a function of said error signal and its first derivative; and further incorporates a means to connect the above-mentioned regulating control signal generated by said conditioning logic means to the second of said differentiating means; and further incorporates a means whereby said regulating control signal and the output of said second differentiating means are combined to obtain a second resultant signal which is a function of said regulating control signal and its first derivative; and further incorporates an output combination means whereby said first resultant signal and said second resultant signal are combined, whereby said output combination means generates the above-mentioned "reward-punish" reinforcement signal output of said performance assessment device means.

6. The self-organizing control system of claim 5, and wherein said output combination means incorporates a means whereby sign information is extracted from said first resultant signal; and further incorporates a means whereby sign information is extracted from said second resultant signal; and further incorporates a means for performing Boolean logic operations on said first resultant signal sign information and on said second resultant signal sign information, whereby said logic means generates the above-mentioned "reward-punish" reinforcement signal output of said performance assessment device means.

7. The self-organizing control system of claim 1, and wherein said conditioning logic means incorporates at least one modular device, said device incorporating means connecting the above-mentioned "reward-punish" reinforcement signal generated by said performance assessment means to the above-mentioned means for logical combination of an input reinforcement signal with an internal feedback signal representing attempted prior output regulating control signal change; and further incorporating a memory means to provide a signal representing attempted prior change of the regulating control signal; and further incorporating an internal feedback means connecting said memory means with said logical combination means; and further incorporating a means whereby the decisions of said logical combination means are translated into changes in the above-mentioned regulating control signal; and further incorporating a means for storage of the output signal, which is the said regulating control signal; and further incorporating a means for converting or transforming the characteristics of said output signal to achieve compatibility with the input characteristics of said controlled plant.

8. The self-organizing control system of claim 7, and wherein said memory means consists of a multiple-stage shift register having at least four stages, said stages containing record signals corresponding to the polarity of the attempted output regulating control signal change pertinent to each of at least four previous trials immediately preceding the current trial, and means to select any one of said record signals for delivery to the conditioning logic input stage.

9. The self-organizing control system of claim 7, and wherein said conditioning logic input stage logical combination means incorporates means to form a signal representing the mathematical complement of the exclusive-OR function of said input reinforcement signal and said internal memory feedback signal.

10. The self-organizing control system of claim 7, and wherein the means to translate decisions generated by said input stage logical combination means into changes in the regulating control signal employs a bi-directional counter which is incremented in a positive or negative direction in response to the polarity of decisions of said logical combination means, and further incorporates a means for translating the contents of said counter into changes of the regulating control signal.

11. The self-organizing control system of claim 10, and wherein said means for translating the contents of said counter into changes of the regulating control signal employs a statistical source, consisting of a signal generator providing an output which is a random sequence of binary signals and means to control the probability state of said signal generator in accordance with the contents of the above-mentioned counter.

12. The self-organizing control system of claim 11, and wherein said means for controlling the probability state of the signal generator incorporates a means whereby the contents of the above-mentioned counter are converted to an analog signal, and further incorporates means for delivery of said analog signal to said statistical source.

13. The self-organizing control system of claim 1, and wherein said means connecting the output of at least one controller input summing device to the input of said performance assessment means incorporates the sum of mathematically positive semi-definite functions of the outputs of a plurality of said summing devices, and further incorporates means connecting said sum of positive semi-definite functions to the input of said performance assessment means.

14. In a self-organizing control system, a controlled device provided with means developing a system performance signal corresponding to the state of the device and having an input adapted to receive a regulating control signal, means to generate said regulating control signal comprising an input signal summing device adapted to receive a command signal, a feed-back loop connecting said system performance signal developing means to an input of said summing device, whereby said summing device yields an output signal representing system error, a performance-assessment device for comparing the signs of a predicted error signal and a derivative of the predicted error signal to develop a "reward-punish" output signal in accordance with input information received thereby, means connecting the output of the summing device to the input of the performance-assessment device, a conditioning logic device developing an output signal in accordance with the combination of a prevailing input signal and a previous output signal thereof, and means connecting the output of the performance-assessment device to the input of the conditioning logic device.

15. The self-organizing control system of claim 14, and wherein said performance-assessment device comprises at least two signal differentiating stages and means to combine the respective outputs of said signal differentiating stages, whereby to generate said "reward-punish" output signal.

16. The self-organizing control system of claim 14, and wherein said performance-assessment device comprises a plurality of successive differentiating stages, means to feed the system error signal at the output of the summing device to the input of the first differentiating stage, and means to combine the respective outputs of the first differentiating stage with the output of another differentiating stage, whereby to generate said "reward-punish" output signal.

17. The self-organizing control system of claim 14 further including an $n^{th}$ order controlled plant, said derivative being the $n^{th}$ derivative of said predicted error signal.

18. The self-organizing control system of claim 16, and wherein said performance assessment device comprises three successive differentiating stages, and said last-mentioned means combines the respective outputs of the first differentiating stage and the last differentiating stage.

19. The self-organizing control system of claim 17, and respective level-detecting devices connected between the outputs of the differentiating stages and the last-named means.

20. The self-organizing control system of claim 18, and respective level-detecting devices connected between the output of the first differentiating stage and the last-named means and the output of the last differentiating stage and said last-named means.

21. The self-organizing control system of claim 14, and wherein said conditioning logic device comprises an input logic stage, an output register providing the control-signal at its output, circuit means connecting the output of the input logic stage to the input of the output register, a memory register, and a feed-back loop connected from the output of said output register to the input logic stage through said memory register.

22. The self-organizing control system of claim 14, and wherein said conditioning logic stage comprises an input logic stage, an output register providing the control signal at its output, a statistical source, circuit means connecting the output of the input logic stage to the input of the output register through said statistical source, a memory register, and a feedback loop connected from the output of said output register to the input logic stage through said memory register.

23. The self-organizing control system of claim 22, and wherein said statistical source comprises a signal generator providing an output which is a random sequence of different binary signals and means to control the state of said signal generator in accordance with an input analog voltage, and register means connected between said input logic stage and said signal generator to develop said input analog voltage in accordance with the "reward-punish" output signal of the performance-assessment device.

24. The self-organizing control system of claim 23, and clock means to periodically simultaneously energize said last-named register means and said output register.

25. A performance-assessment device for a control system which comprises means responsive to a system error signal to provide a signal indicative of predicted system error and means responsive to the sign of said signal indicative of predicted system error and the sign of a derivative of said predicted system error signal to provide a reward-punish signal.

26. A performance-assessment device as set forth in claim 25 wherein said system to be controlled is an $n^{th}$ order system and said derivative is the $n^{th}$ derivative of said predicted system error signal.

27. A performance-assessment device as set forth in claim 25 wherein said reward-punish signal provides a reward indication when the sign of said predicted system error signal and the sign of the derivative of the predicted system error signal are different.

28. A performance-assessment device as set forth in claim 26 wherein said reward-punish signal provides a reward indication when the sign of said predicted system error signal and the sign of the derivative of the predicted system error signal are different.

29. A performance-assessment device as set forth in claim 25 wherein said means responsive to a system error signal includes means to operate on said system error signal by the function $(1+Ts)$.

30. A performance-assessment device as set forth in claim 26, wherein said means responsive to a system error signal includes means to operate on said system error signal by the function $(1+Ts)$.

31. A performance-assessment device as set forth in claim 28 wherein said means responsive to a system error signal includes means to operate on said system error signal by the function $(1+Ts)$.

32. A performance-assessment device for a control system which comprises means responsive to a system error signal to provide a signal indicative of predicted system error, means responsive to a plant control signal for controlling said system to provide a signal indicative of predicted control signal and means responsive to the sign of said signal indicative of predicted system error and the sign of said signal indicative of predicted control signal for providing a reward-punish signal.

33. A performance-assessment device as set forth in claim 32 wherein said means responsive to the sign of said signal indicative of predicted system error and the sign of said signal indicative of predicted control signal provides a reward signal when the signs of said signals are different.

34. A performance-assessment device as set forth in claim 32 wherein said means responsive to a system error signal includes means to operate on said system error signal by the function $(1+Ts)$.

35. A performance-assessment device as set forth in claim 33 wherein said means responsive to a system error signal includes means to operate on said system error signal by the function $(1+Ts)$.

36. A system for controlling a plant by means of a regulating control signal in response to system "reward-punish" value signals which includes a source of said "reward-punsh" value signals, logical combinations means, means to provide a feedback signal representing attempted prior output regulating control signal changes, said means including memory means for providing signals representing attempted prior changes of the regulating control signal, feedback means connecting said memory means to said logical combination means, said logical combination means being responsive to said value signals and said feedback signal for providing said regulating control signal, said logical combination means combining said inputs thereto to provide said regulating control signal compatible with said plant.

37. The self-organizing control system of claim 36 and wherein said memory means comprises a multiple-stage shift register having at least four stages, said stages containing record signals corresponding to the polarity of the attempted output regulating control signal change pertinent to each of at least four previous trials immediately preceding the current trial, and means to select any one of said record signals for delivery to the conditioning logic input stage.

38. The system of claim 36 wherein said logical combination means includes means to form a signal representing the mathematical complement of the exclusive-OR function of said input reinforcement signal and said memory feedback signal.

39. The system of claim 36 and wherein the means to translate decisions generated by said input stage logical combination means into changes in the regulating control signal employs a bi-directional counter which is incremented in a positive or negative direction in response to the polarity of decisions of said logical combination means, and further incorporates a means for translating the contents of said counter into changes of the regulating control signal.

40. The system of claim 39 wherein said means for translating the contents of said counter into changes of the regulating control signal employs a statistical source, comprising a signal generator for providing an output which is a random sequence of binary signals and means to control the probability state of said signal generator in accordance with the contents of said counter.

41. The system of claim 40 wherein said means for controlling the probability state of the signal generator includes means for converting the contents of said counter to an analog signal, and means for delivery of said analog signal to said statistical source.

References Cited

UNITED STATES PATENTS

| | | | |
|---|---|---|---|
| 3,216,676 | 11/1965 | Brown | 244—77 |
| 3,221,230 | 11/1965 | Osburn | 318—28 |
| 3,044,701 | 7/1962 | Kerstukos et al. | 235—151 |
| 3,057,584 | 10/1962 | Bretoi | 244—77 |
| 3,109,970 | 11/1963 | Smyth | 235—150.1 |
| 3,113,749 | 12/1963 | Lee | 244—77 |
| 3,137,462 | 6/1964 | Hendrick | 244—77 |
| 3,149,601 | 9/1964 | Lang | 114—66.5 |
| 3,221,151 | 11/1965 | Cattel et al. | 235—150.1 |
| 3,225,179 | 12/1965 | Chestnut et al. | 235—151.1 |
| 3,237,170 | 2/1966 | Blasbalg et al. | 340—172.5 |
| 3,327,291 | 6/1967 | Lee | 340—172.5 |
| Re. 25,491 | 12/1963 | Lee | 244—77 |

OTHER REFERENCES

Lee, R. J., "Self-Programming Information and Control Equiment (Spice)." Melpar, Inc. Report, pp. 1–98, June 1, 1959.

Ergin, E. I., et al., "Techniques for Analysis of Nonlinear Attitude Control Systems for Space Vehicles." Technical Documentary Report No. ASD–TDR–62–208, vol. I, pp. 1–49, June 1962.

Ostgaard, M. A., et al., "Adaptive and Self-Organizing Flight Control Systems." In Aerospace Engineering, pp. 80–116, September 1962.

Lee, R. J., et al., "Functional Capability of Neuromime Networks for Use in Attitude Stabilization Systems." Technical Documentary Report No. ASD–TDR–63–549, pp. 1–235, September 1963.

Mirabelli, R. E., et al., "Feasibility Studies on Use of Artrons as Logic Elements in Flight Control Systems." Technical Documentary Report No. FDL–TDR–64–23, pp. 1–134, September 1964.

Barron, R. L., "Self-Organizing and Learning Control System." Presented to 1966 Bionics Symposium, Dayton, Ohio, May 2–5, 1966. Adaptronics, Inc., McLean, Va. 22101.

Self-Organizing Adaptive System for Space Vehicle Attitude Control, by R. L. Barron, et al., presented before Meeting of the SAE A–18 Committee, Miami Beach, Fla., December 9–11, 1969. Adaptronics, Inc., 4725 Duke St., Alexandria, Va. 22304.

ROBERT C. BAILEY, Primary Examiner

J. P. VANDENBURG, Assistant Examiner

U.S. Cl. X.R.

235—150, 151